(12) United States Patent
Wang et al.

(10) Patent No.: US 10,880,835 B2
(45) Date of Patent: Dec. 29, 2020

(54) METHODS FOR EFFICIENT MEDIUM ACCESS FOR WAKE UP RADIOS

(71) Applicant: InterDigital Patent Holdings, Inc., Wilmington, DE (US)

(72) Inventors: Xiaofei Wang, Cedar Grove, NJ (US); Hanging Lou, Syosset, NY (US); Oghenekome Oteri, San Diego, CA (US); Frank La Sita, Setauket, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 16/347,193

(22) PCT Filed: Nov. 2, 2017

(86) PCT No.: PCT/US2017/059767
§ 371 (c)(1),
(2) Date: May 2, 2019

(87) PCT Pub. No.: WO2018/085571
PCT Pub. Date: May 11, 2018

(65) Prior Publication Data
US 2019/0357143 A1     Nov. 21, 2019

Related U.S. Application Data

(60) Provisional application No. 62/529,923, filed on Jul. 7, 2017, provisional application No. 62/501,933, filed on (Continued)

(51) Int. Cl.
*H04W 52/02*     (2009.01)
*H04W 40/24*     (2009.01)
*H04W 80/02*     (2009.01)

(52) U.S. Cl.
CPC ..... *H04W 52/0229* (2013.01); *H04W 40/244* (2013.01); *H04W 52/0235* (2013.01); *H04W 80/02* (2013.01)

(58) Field of Classification Search
CPC ......... H04W 52/0229; H04W 52/0235; H04W 52/028; H04W 40/244; H04W 80/02;
(Continued)

(56) References Cited

U.S. PATENT DOCUMENTS 10,349,455 B2 *   7/2019   Park ................... H04W 8/005
2014/0185473 A1 *   7/2014   Wong ............... H04W 74/0808
                                                              370/252
(Continued)

FOREIGN PATENT DOCUMENTS

WO     WO-2016/036581     3/2016

OTHER PUBLICATIONS

"Part 11: Wireless LAN Medium Access Control (MAC) and Physical Layer (PHY) Specifications", IEEE Standards Association; 802.11 ™-2012, Mar. 29, 2012, 2793 pages.
(Continued)

*Primary Examiner* — Brian D Nguyen
(74) *Attorney, Agent, or Firm* — Yin Shao

(57) ABSTRACT

Methods and systems are described for efficient medium access in wake-up radios. In an exemplary embodiment, a wake up frame (WUF) includes fields indicating a wake-up purpose, wake-up scheduling, and a wake-up TX/RX parameter. The wake-up purpose field identifies one of a plurality of predetermined purposes. A STA receives the wake-up frame and determines whether the frame is intended for that STA. If so, the STA responsively performs an action in accordance with the purpose indicated in the purpose field. Purposes that may be indicated in the WIF purpose field may
(Continued)

include Listen to Beacon, Uplink Data Transmission, Downlink Data Transmission, and (Re)Association, among others.

20 Claims, 11 Drawing Sheets

Related U.S. Application Data on May 5, 2017, provisional application No. 62/417,140, filed on Nov. 3, 2016.

(58) Field of Classification Search
CPC .. Y02D 70/142; Y02D 70/26; Y02D 70/1246; Y02D 70/23; Y02D 70/1444; Y02D 70/164; Y02D 70/00; Y02D 70/146; Y02D 70/1244; Y02D 70/21; Y02D 70/22; Y02D 70/1264; Y02D 70/1262
See application file for complete search history.

(56) References Cited

U.S. PATENT DOCUMENTS

| | | | |
|---|---|---|---|
| 2014/0211678 A1 | 7/2014 | Jafarian et al. | |
| 2015/0208349 A1* | 7/2015 | Ramamurthy | H04W 52/028 370/311 |
| 2015/0382283 A1* | 12/2015 | Wang | H04W 52/02 370/328 |
| 2016/0345324 A1* | 11/2016 | Shu | H04H 20/38 |
| 2018/0042059 A1* | 2/2018 | Park | H04W 8/005 |
| 2018/0227650 A1* | 8/2018 | Colonna | H04L 63/102 |
| 2019/0053134 A1* | 2/2019 | Kim | H04W 74/0891 |

OTHER PUBLICATIONS

"Part 11: Wireless LAN Medium Access Control (MAC) and Physical Layer (PHY) Specifications Amendment 3: Enhancements for Very High Throughput in the 60 GHz Band", IEEE Standards Association; 802.11ad™-2012, Dec. 28, 2012, 628 pages.

"Part 11: Wireless LAN Medium Access Control (MAC) and Physical Layer (PHY) Specifications Amendment 5: Television White Spaces (TVWS) Operation", IEEE Standards Association; 802.11af™-2013, Dec. 11, 2013, 198 pages.

"Part 11: Wireless LAN Medium Access Control (MAC) and Physical Layer (PHY) specifications, Amendment 4: Enhancements for Very High Throughput for Operation in Bands below 6 GHz", IEEE Standards Association; 802.11ac™-2013, Dec. 11, 2013, 425 pages.

Aboul-Magd, Osama, et al., "802.11 HEW SG Proposed PAR", Huawei Technologies; IEEE P802.11 Wireless LANs; Doc. IEEE 802.11-14/0165r0 (available at https://mentor.ieee.org/802.11/dcn/14/11-14-0165-01-0hew-802-11-hew-sg-proposed-par.docx), Mar. 17, 2014, 6 pages.

Aboul-Magd, Osama, "IEEE 802.11 HEW SG Proposed CSD", Huawei Technologies; IEEE P802.11 Wireless LANs; doc: IEEE 802.11-14/0169r0 (available at https://mentor.ieee.org/802.11/dcn/14/11-14-0169-01-0hew-ieee-802-11-hew-sg-proposed-cds.docx), Mar. 18, 2014, 6 pages.

Azizi, Shahrnaz, et al., "A PAR Proposal for Wake-up Radio", IEEE P802.11 Wireless LANs; doc. IEEE 802.11-16/1045r06, Jul. 28, 2016, 5 pages.

Azizi, Shahrnaz, et al., "Wake-up Receiver Usage Scenarios and Applications", IEEE 802.11-16-0974r0; Intel Corporation, Jul. 25, 2016, 9 pages.

* cited by examiner

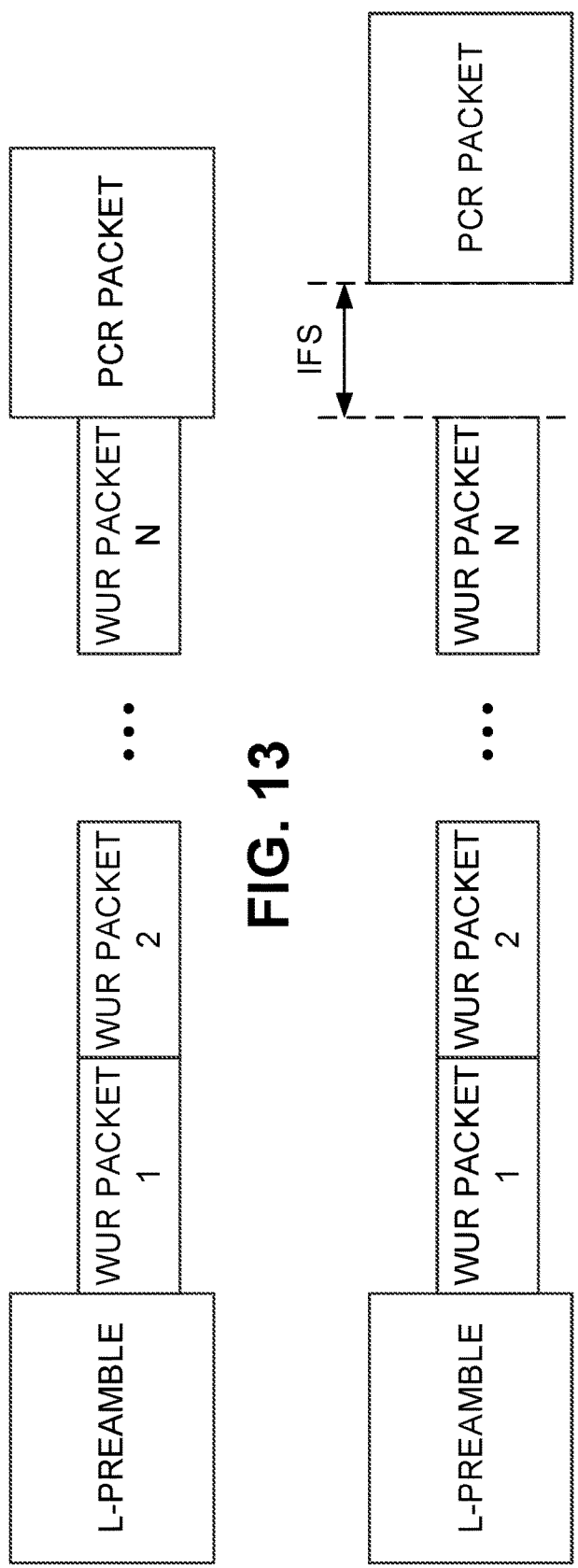
FIG. 13
FIG. 14
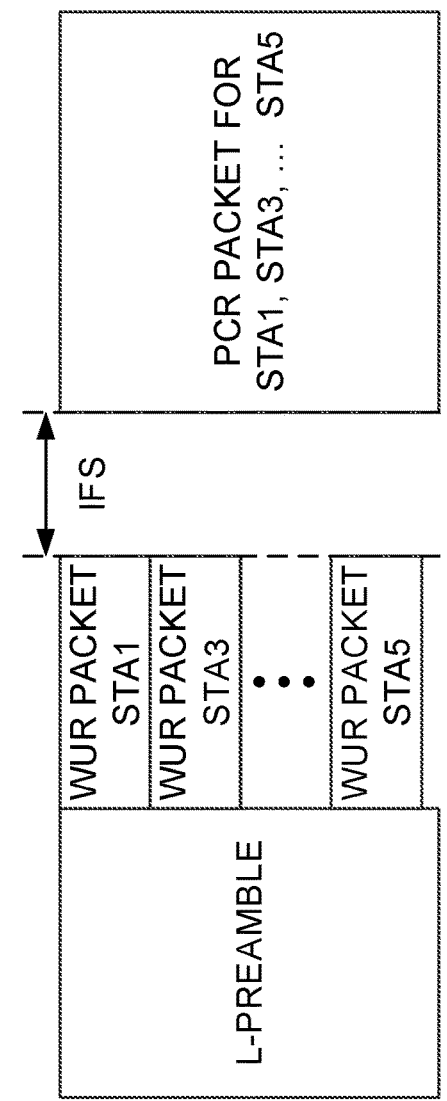
FIG. 15

METHODS FOR EFFICIENT MEDIUM ACCESS FOR WAKE UP RADIOS

CROSS-REFERENCE TO RELATED APPLICATIONS

The present application is a 371 U.S. National Stage entry of PCT Application No. PCT/US2017/059767, filed Nov. 2, 2017, which is a non-provisional filing of, and claims benefit under 35 U.S.C. § 119(e) from, the following U.S. Provisional Patent Application Ser. No. 62/417,140 entitled "Methods for Efficient Medium Access for Wake Up Radios," filed Nov. 3, 2016; Ser. No. 62/501,933 entitled "Methods for Efficient Medium Access for Wake Up Radios," filed May 5, 2017; and Ser. No. 62/529,923 entitled "Methods for Efficient Medium Access for Wake Up Radios," filed Jul. 7, 2017, all of which are incorporated herein by reference in their entirety.

BACKGROUND

Overview of WLAN Systems

A wireless local area network (WLAN) in Infrastructure Basic Service Set (BSS) mode has an Access Point (AP) for the BSS and one or more stations (STAs) associated with the AP. The AP typically has access or interface to a Distribution System (DS) or another type of wired/wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA. Such traffic between STAs within a BSS is really peer-to-peer traffic. Such peer-to-peer traffic may also be sent directly between the source and destination STAs with a direct link setup (DLS) using an 802.11e DLS or an 802.11z tunneled DLS (TDLS). A WLAN using an Independent BSS (IBSS) mode has no AP, and/or STAs, communicating directly with each other. This mode of communication is referred to as an "ad-hoc" mode of communication.

Using the 802.11ac infrastructure mode of operation, the AP may transmit a beacon on a fixed channel, usually the primary channel. This channel may be 20 MHz wide, and is the operating channel of the BSS. This channel is also used by the STAs to establish a connection with the AP. The fundamental channel access mechanism in an 802.11 system is Carrier Sense Multiple Access with Collision Avoidance (CSMA/CA). In this mode of operation, every STA, including the AP, will sense the primary channel. If the channel is detected to be busy, the STA backs off. Hence only one STA may transmit at any given time in a given BSS.

In 802.11n, High Throughput (HT) STAs may also use a 40 MHz wide channel for communication. This is achieved by combining the primary 20 MHz channel, with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz, and 80 MHz, channels are formed by combining contiguous 20 MHz channels similar to 802.11n described above. A 160 MHz channel may be formed either by combining 8 contiguous 20 MHz channels, or by combining two non-contiguous 80 MHz channels, this may also be referred to as an 80+80 configuration. For the 80+80 configuration, the data, after channel encoding, is passed through a segment parser that divides it into two streams. Inverse fast Fourier Transform (IFFT) and time domain processing are done on each stream separately. The streams are then mapped on to the two channels, and the data is transmitted. At the receiver, this mechanism is reversed, and the combined data is sent to the MAC.

Sub 1 GHz modes of operation are supported by 802.11af, and 802.11ah. For these specifications, the channel operating bandwidths, and carriers, are reduced relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. A possible use case for 802.11ah is support for machine-type communication (MTC) devices in a macro coverage area. MTC devices may have limited capabilities including only support for limited bandwidths, but also include a requirement for a very long battery life.

WLAN systems which support multiple channels, and channel widths, such as 802.11n, 802.11ac, 802.11af, and 802.11ah, include a channel which is designated as the primary channel. The primary channel may, but not necessarily, have a bandwidth equal to the largest common operating bandwidth supported by all STAs in the BSS. The bandwidth of the primary channel is therefore limited by the STA, of all STAs in operating in a BSS, which supports the smallest bandwidth operating mode. In the example of 802.11ah, the primary channel may be 1 MHz wide if there are STAs (e.g. MTC type devices) that only support a 1 MHz mode even if the AP, and other STAs in the BSS, may support a 2 MHz, 4 MHz, 8 MHz, 16 MHz, or other channel bandwidth operating modes. All carrier sensing, and NAV settings, depend on the status of the primary channel: if the primary channel is busy, for example, due to a STA supporting only a 1 MHz operating mode is transmitting to the AP, then the entire available frequency bands are considered busy even though majority of it stays idle and available.

In the United States, the available frequency bands which may be used by 802.11ah are from 902 MHz to 928 MHz. In Korea it is from 917.5 MHz to 923.5 MHz; and in Japan, it is from 916.5 MHz to 927.5 MHz. The total bandwidth available for 802.11ah is 6 MHz to 26 MHz depending on the country code.

High Efficiency WLAN Study Group and TGax

The IEEE 802.11™ High Efficiency WLAN (HEW) Study Group (SG) was created to explore the scope and purpose of a possible, future amendment to enhance the quality of service all users experience for a broad spectrum of wireless users in many usage scenarios including high-density scenarios in the 2.4 GHz and 5 GHz band. New use cases which support dense deployments of APs, and STAs, and associated Radio Resource Management (RRM) technologies are being considered by the HEW SG.

Potential applications for HEW include emerging usage scenarios such as data delivery for stadium events, high user density scenarios such as train stations, or enterprise/retail environments, and also evidence for an increased dependence on video delivery, and wireless services for medical applications.

The IEEE Standard board approved the IEEE 802.11ax Task Group (TG) based on a Project Authorization Request (PAR) and Criteria for Standards Development (CSD) developed in the HEW SG.

In TGax standard meetings, several contributions showed that the measured traffic for a variety of applications has a large likelihood for short packets, and there are network applications that may also generate short packets. The applications include the following:
  Virtual office
  TPC ACK
  Video streaming ACK
  Device/Controller (Mice, keyboards, Game controls, etc.)
  Access—Probe request/response
  Network selection—probe requests, ANQP
  Network management—Control frames Also, many contributions in 802.11ax have proposed the introduction of MU features that include UL and DL OFDMA and UL and DL MU-MIMO. Designing and defining a mechanism for multiplexing UL random access for different purposes may be considered in the specification.

The Wake Up Receiver (WUR) Study Group

In July 2016, the IEEE 802.11™ Wake Up Radio (WUR) Study Group (SG) was created to explore the scope and purpose of a future PHY and MAC amendment to provide enhanced low power operations of 802.11 devices. The MAC and PHY amendments may enable operations of a wake-up radio (WUR). A proposed Project Authorization Request (PAR) and Criteria for Standards Development (CSD) documents have been accepted by the WUR SG.

The expected operation bands of the WUR include 2.4 GHz, 5 GHz and may be extended to Sub 1 GHz. A WUR device operates as a companion radio to the primary connectivity radio, which is used to transmit regular 802.11 packets. WUR transmits packets that carry only control information and has active receiver power consumptions of less than one milliwatt. Receiving a wake-up packet by the WUR may cause the primary connectivity radio to wake up from sleep. The WUR is expect to have a range that is at least the same as the range of the primary connectivity radio operating on at least 20 MHz payload bandwidth.

Both AP and non-AP STAs may have WUR as a companion radio. Some usage cases for WUR include: IoT devices; low power operation for smart phones; quick message/incoming call notification scenario; quick status query/report, configuration change scenario; and quick emergency/critical event report scenario.

SUMMARY

In an exemplary embodiment, a method is performed by a station (STA) equipped with a wake-up radio (WUR) and a primary connectivity radio (PCR). While the STA is in a sleep state, the STA receives on the WUR a wake-up frame (WUF) from an access point (AP), where the wake-up packet includes a WUF purpose field including a purpose indicator identifying one of a plurality of predetermined WUF purposes. In response to the WUF, the STA wakes up the PCR and operates the PCR to communicate with the AP according to the purpose identified by the purpose indicator. In some embodiments, the plurality of predetermined WUF purposes include at least Listen to Beacon, Uplink Data Transmission, Downlink Data Transmission, and Association.

In response to a purpose indicator that indicates Listen to Beacon, the STA may operate the PCR to receiving the beacon from the AP on the PCR. In some embodiments, the PCR is returned to the sleep state after receiving the beacon.

In response to a purpose indicator that indicates an uplink data transmission, the STA may operate the PCR to transmit uplink data from the STA to the AP. In some embodiments, the STA does not send any PS-Poll frame between the waking up of the PCR and the transmission of the uplink data.

In some embodiments, in response to a WUF that includes receive parameters and a purpose indicator that indicates multi-user downlink transmission, the PCR is operated to use the receive parameters to receive a downlink packet intended for the STA. The receive parameters may include a scheduled receive time for the STA.

In some embodiments, a method for waking up an AP for association and the medium access procedure for an STA and AP using their primary connectivity radio (PCRs) after the AP is woken up includes an STA, (e.g., STA1), equipped with a WUR sending a WUF such as a WUReqF to discover a suitable AP for association, re-association, uplink transmission, or uplink/downlink transmission.

In some embodiments, a procedure for an STA to wake up another STA for UL/DL/Peer2Peer transmissions and the procedure for medium access for the STAs to conduct such UL/DL/Peer2Peer transmissions includes an STA, e.g., STA1 (which may be a non-AP STA or AP), equipped with a WUR sending a WUF such as a WUReqF to wake up one or more other STAs, e.g., STA2, e.g., when it has information indicating that STA2 is currently in a sleep state.

In an exemplary embodiment, a wake up frame includes fields indicating a wake-up purpose, wake-up scheduling, and a wake-up TX/RX parameter. The wake-up purpose field includes a purpose indicator that identifies one of a plurality of predetermined WUF purposes. A STA receives the wake-up frame and determines whether the frame is intended for that STA. The STA may ignore the wake-up frame if that frame is not intended for itself. If the wake-up frame is intended for the STA, the STA responsively performs an action in accordance with the purpose indicated in the purpose field. If the purpose is "Rx beacon," the STA turns on its primary connectivity radio (PCR) at the scheduled time and adjusts receive parameters to receive a beacon and subsequently to return to sleep. If the purpose is "UL data transmission", the STA turns on its PCR at the scheduled time and adjusts transmit parameters to transmit uplink data without sending a PS-Poll. If the purpose is "DL data transmission", the STA turns on its PCR at the scheduled time and adjusts receive parameters to receive downlink data. If the purpose is "association", the STA turns on its PCR and transmits a probe response or beacon. Additional and alternative actions performed in response to different wake-up purpose indications are further described herein.

BRIEF DESCRIPTION OF THE DRAWINGS

FIG. 13 illustrates single transmission of multiple WUR packets and a PCR packet, in accordance with some embodiments.

FIG. 14 illustrates consecutive transmission of multiple WUR packets and a PCR packet, in accordance with some embodiments.

FIG. 15 illustrates single transmission of multiple WUR packets and PCR packets for multiple STAs, in accordance with some embodiments.

EXAMPLE NETWORKS FOR IMPLEMENTATION OF THE EMBODIMENTS

Figure 1A:
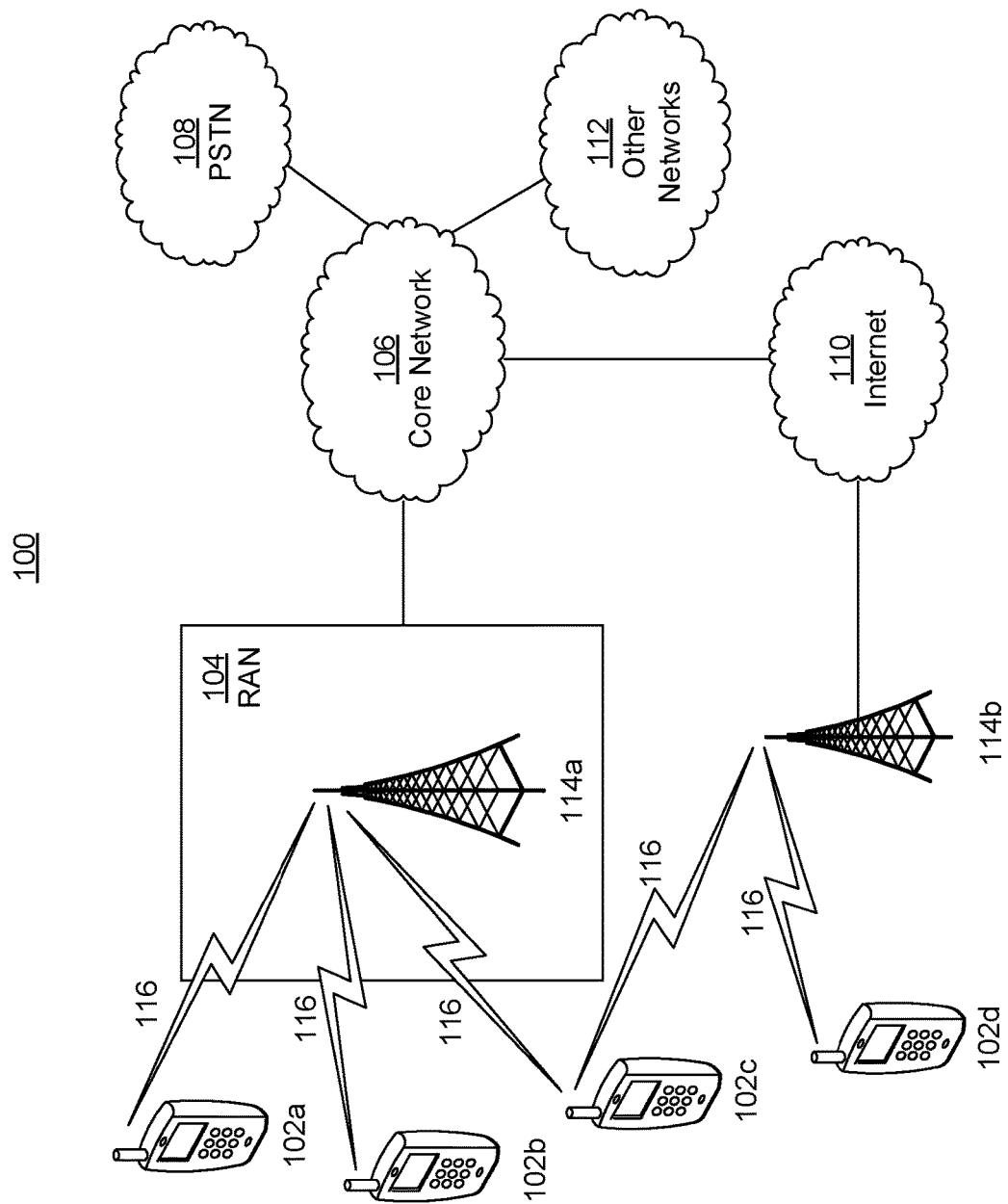
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
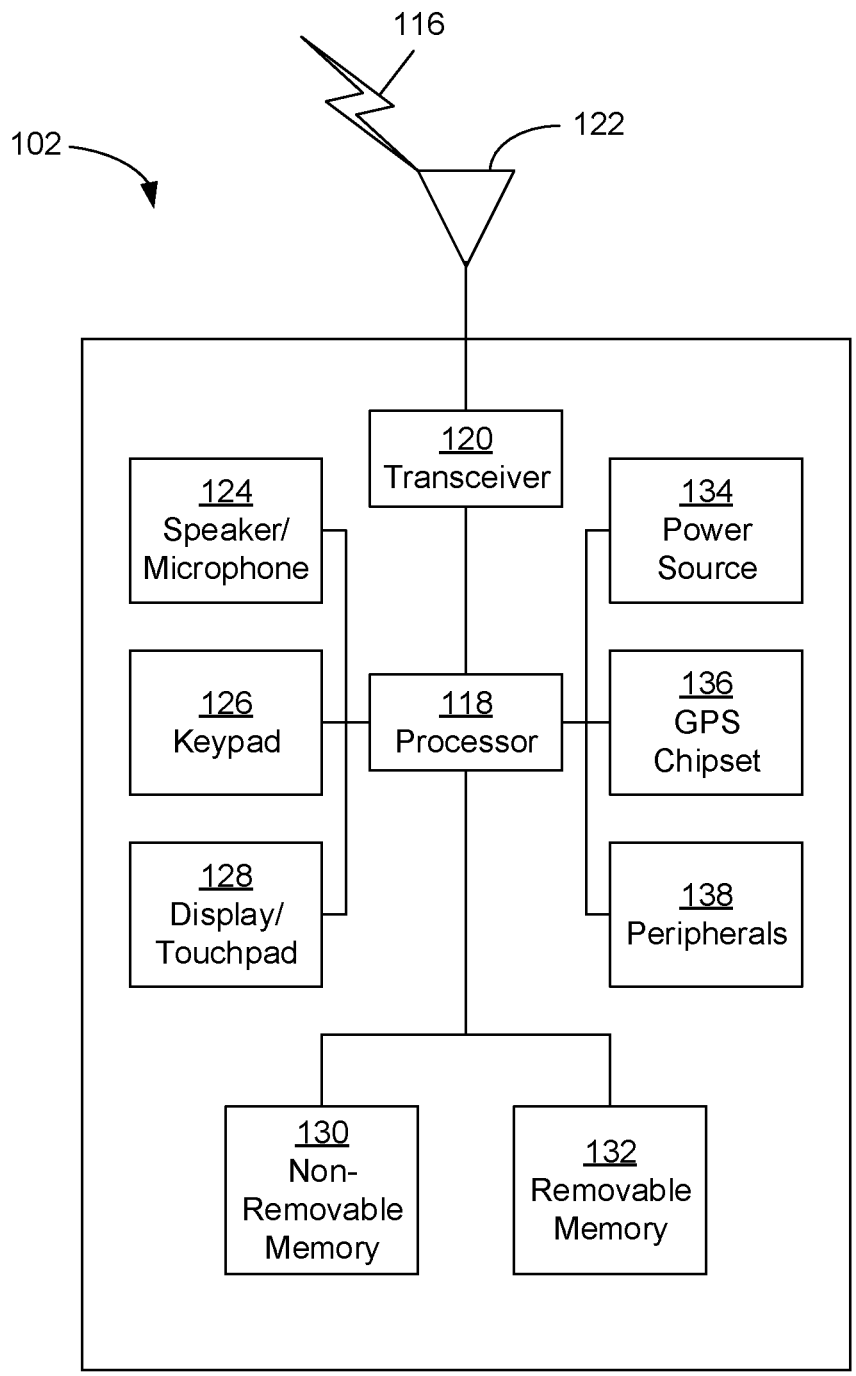
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
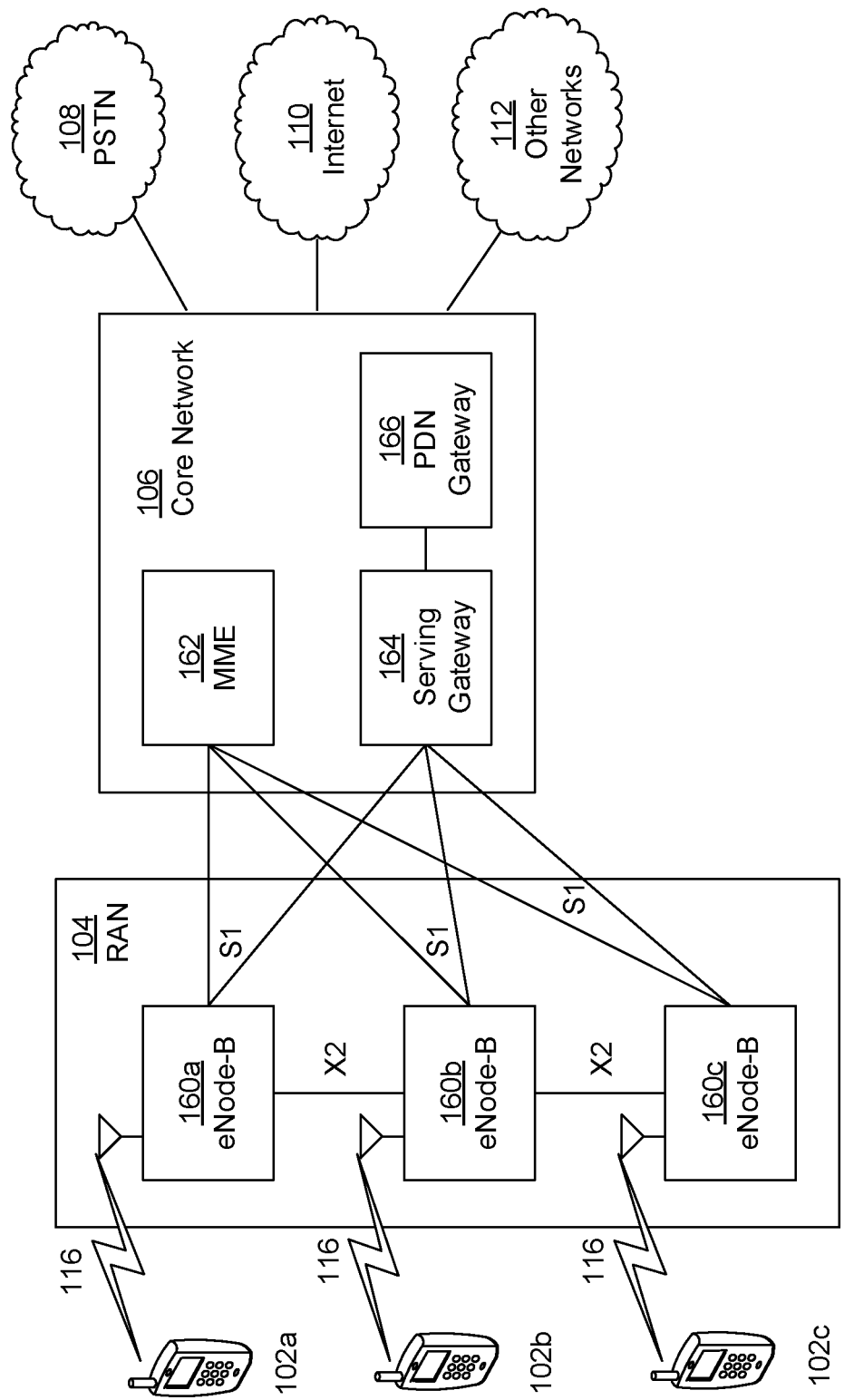
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
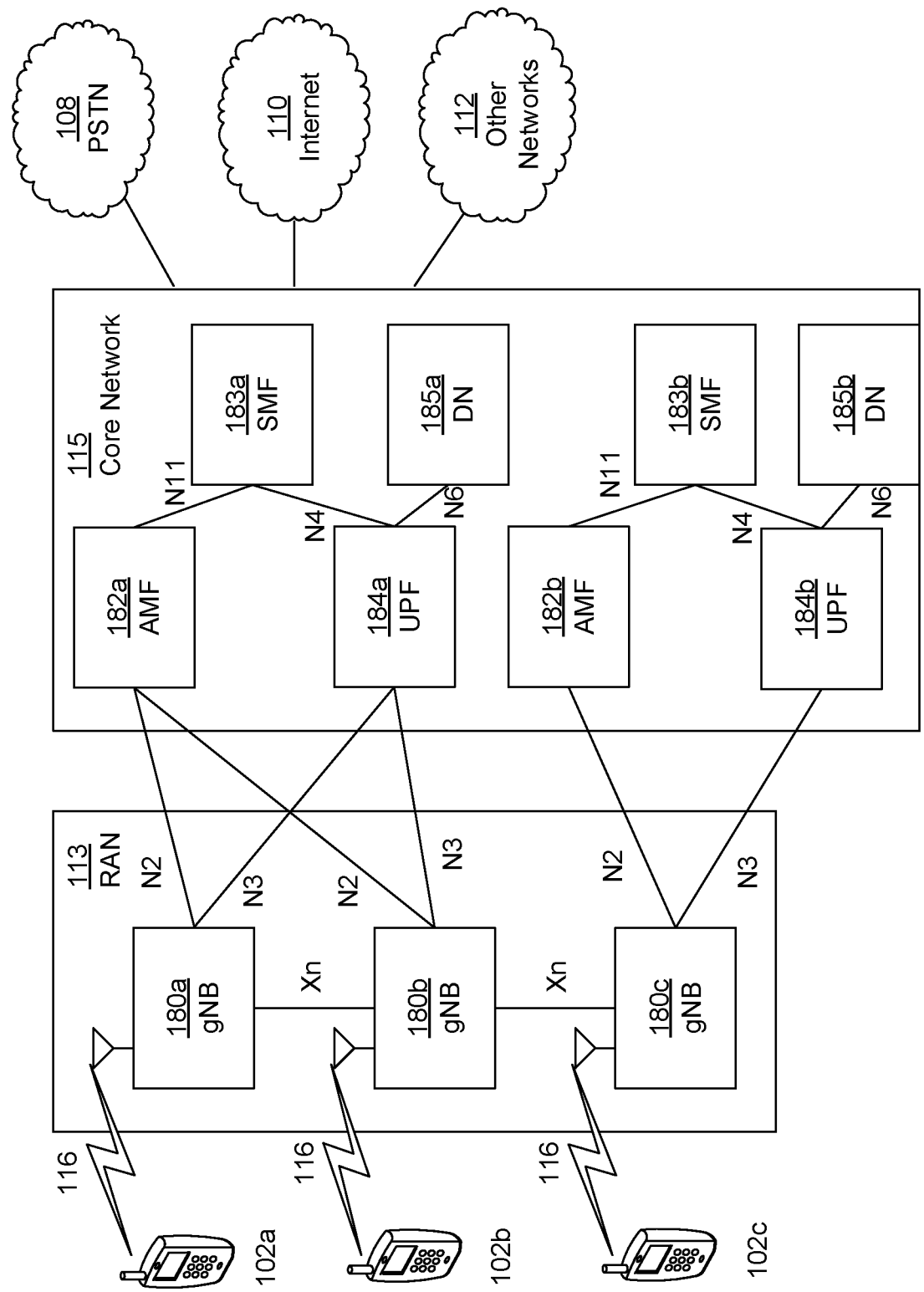
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Medium Access and Transmission Procedures After Waking up STAs Equipped With WUR STAs and APs equipped with WURs may be woken up for different reasons, such as network discovery, emergency alarms, buffered traffic for uplink (UL) and downlink (DL) transmissions, request for beacons, etc. The different wake up scenarios likely lead to different behaviors for STAs and APs.

Solutions for signaling the different reasons for waking up STAs and AP and providing correct medium access and transmission procedures when STAs and APs are woken up and ready to conduct communications using their primary connectivity radios (PCRs) are described herein.

Figure 2:
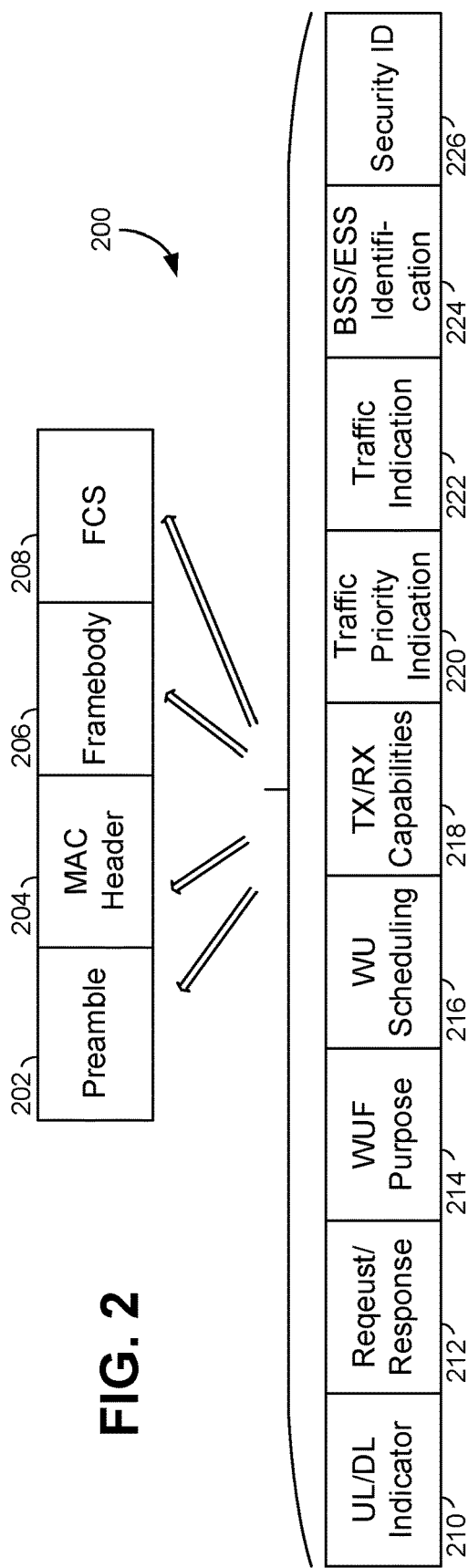
FIG. 2 depicts a design of a wake up request frame (WUReqF), in accordance with some embodiments.

In some embodiments a Wake Up Radio (WUR) may use one or more types of Wake Up Frames (WUFs). A WUR associated with a STA may use a Wake Up Request Frame (WUReqF) to request that one or more STAs to wake up by turning on their primary connectivity radios (PCRs). FIG. 2 illustrates an example design of a wake up request frame (WUReqF) 200, in accordance with some embodiments.

The WUReqF may contain one or more of the following parts: a preamble 202 which may include a regular WLAN preamble and/or a WUR preamble, a MAC header 204, a frame body 206 and/or a FCS field 208. In some embodiments, the WUReqF may include other parts such as a packet extension, a control trailer, etc.

As shown in FIG. 2 the WUReqF 200 may include one or more of the following fields: a UL/DL indicator 210, a Request/Response Indication 212, a WUF Purpose field 214, a WU Scheduling field 216, a TX/RX Capabilities field 218, a Traffic Priority Indication field 220, a Traffic Indication field 222, a BSS/ESS Identification field 224, and a Security ID field 226.

In some embodiments, the uplink/downlink (UL/DL) Indicator 210 indicates if the Wake Up frame is sent (i) in the Uplink direction (from STA to AP), (ii) in the Downlink direction (from AP to STA), (iii) in a peer to peer fashion (from a non-AP STA to another non-AP STA), or (iv) in a AP to AP fashion (from an AP to another AP). In some embodiments, the UL/DL Indicator uses one bit with one value indicating the WUF is sent in the Uplink direction and the other value indicating that the WUF is sent in the Downlink direction. In an alternative embodiment, two bits are used, using for example the value "00" to indicate peer to peer WUF transmissions, "01" to indicate Downlink transmission of WUF, "10" to indicate Uplink WUF transmissions, and using "11" to indicate AP to AP WUF transmissions. In some embodiments, the UL/DL Indicator is included in the preamble or MAC header, or any other part of the WUF, such as Packet Extension and Control Trailers. Alternatively, the UL/DL Indictor may be implemented using scrambler seeds, phase rotations between symbols, etc.

In some embodiments, Request/Response field 212 identifies whether the Wake Up Frame is a Wake up request frame or response frame. In alternative embodiments, the Request/Response frame is identified using one or more bits in the Preamble or MAC header or any other part of the frame, for example, in the Type/Subtype field in the MAC header.

In some embodiments, one or more STA identifiers may be included, such as MAC addresses, Association Identification (AIDs), or any other types of identifiers for one or more STAs that are requested to be woken up.

In some embodiments, the Wake Up Frame (WUF) Purpose field 214 may include information identifying one or more purposes as to why the WUF is sent to wake up the primary connectivity radio associated with the STA that is targeted. In some embodiments, this field indicates one or more of the following: (Re)Association, Authentication, Disassociation, (DL/UL/Peer to Peer) data transmission, Status Inquiry, Emergency Reporting, General, Max Idle Period Reached, Request for Beacon, TDLS Establishment, TDLS De-establishment, Route Discovery, Request to Listen to Beacon, Request to Listen to TIM, Timing Synchronization Function (TSF) Timer Update, Max Idle Period Expiring, etc.

In some embodiments, the Wake Up Scheduling field 216 may include scheduling and configuration for the primary connectivity radio of the targeted STAs after they are awake. In some embodiments, this field indicates whether the primary connectivity radio of the targeted STA will transmit or receive. For example, the WU Scheduling field may include a duration after which the targeted STA is requested to wake up their primary connectivity radio and to start transmitting or receiving. The duration may be referenced to a TSF Timer value (which in some embodiments may be included in the WUF or remembered from a previous transmission), or to the end of the current WUF. In some embodiments, the WU Scheduling field may also include the specific channel, bandwidth, and allocation to be used by the primary connectivity radio(s) for transmission or subsequent receptions. The WU Scheduling field may include channel quality information as well, e.g. interference measured at the WUR transmitter and/or its transmitted power level, to accelerate and improve chances of successful reception of any PCR(s) transmissions back to the WUR transmitter.

In some embodiments, in the TX/RX Capability field 218, one or more TX/RX capabilities and TX/RX modes that the transmitting STA currently supports may be included. Such modes may include the following:

TX/RX Mode: which may include single user (SU), multi user (MU), MU OFDMA, MU MIMO, the number of Spatial Streams, the number of spatial time streams, and the TX/RX bandwidth/resource units (RUs) that the transmitting STA currently supports.

TX/RX Band: the operating band(s) of the STA's PCR, including Sub 1 GHz, 2.4 GHz, 5 GHz, 6 GHz, 45 GHz, and/or 60 GHz, or other bands. The band(s) may be indicated by a value or one or more bits in a bit map.

TX/RX Bandwidth: which may indicate the capabilities of the transmitting STAs that are capable of transmit and/or receive. Values for this field may include one or more 5 MHz, 10 MHz, 20 MHz, 40 MHz, 80 MHz, 160 MHz, 80+80, or any large or smaller bandwidth such as RUs, and/or down-/up-clocked bandwidths.

WUR RX: which may indicate whether the WUF transmitter has a WUR receiver. In some embodiments, WUR transmitters only expect to receive from WLAN PCRs.

In some embodiments, the Traffic Priority Indication field 220 is used to indicate the traffic that is buffered for the targeted STAs. In one such embodiment, the priorities and/or access categories for any or the highest priority buffered traffic are included. Some values for this field may include Status Polling, Emergency Reporting, UL/DL Data Requested, UL/DL Data Reported, and Max Idle Period Exceeded. Additionally or alternatively, traffic priority for buffered traffic intended for the targeted STA may be included such as VI, VO, BK, BE. In an alternative embodiment, a hash of a selection of traffic priority is included.

In some embodiments, the Traffic Indication field 222 is used to indicate the size or the amount of buffered traffic, which may be intended for the targeted STA. In some embodiments, Traffic Indication field indicates whether there is traffic buffered for the targeted STA. Additionally or alternatively, the size of buffered traffic may be included, for example, the number of packets, the size of each or all packets, the estimated time needed to transmit one or more or all buffered traffic.

In some embodiments, the BSS/SS/ESS Identification field 224 is used to identify one or more BSS or ESS for which the WUF is intended. In one such embodiment, one or more IDs of BSS or SS, or ESS are included in this field, such as BSSID, ESSID, SSID, BSS Color. In alternative embodiments, a hash of one or more IDs of BSS, SS or ESS or other identifiers may be included.

In some embodiments, the Security ID field 226 is used to indicate security related information. In at least one such embodiment, this field includes one or more secure password or phrases that both the transmitting and targeted STAs agreed upon before one or both them went into the sleep state. In alternative embodiments, this field includes the answer to a challenge phrase that was sent by the targeted STA. The challenge phrase may be contained in an earlier WUF or in a frame that was sent by the primary connectivity radio (PCR) of the targeted STA before one or both of them went into the sleep state. In one example, the challenge phrase may be sent in a response frame to a STA if a Sleep Notification frame has been received from that STA. In another example, a secure password or phrase will be sent in response to a STA if a Sleep Notification frame has been received from that STA. In yet another example, a secure password or phrase is sent by a STA in a frame that notifies another STA that it is going into the sleep state and will turn off its PCR.

Figure 3:
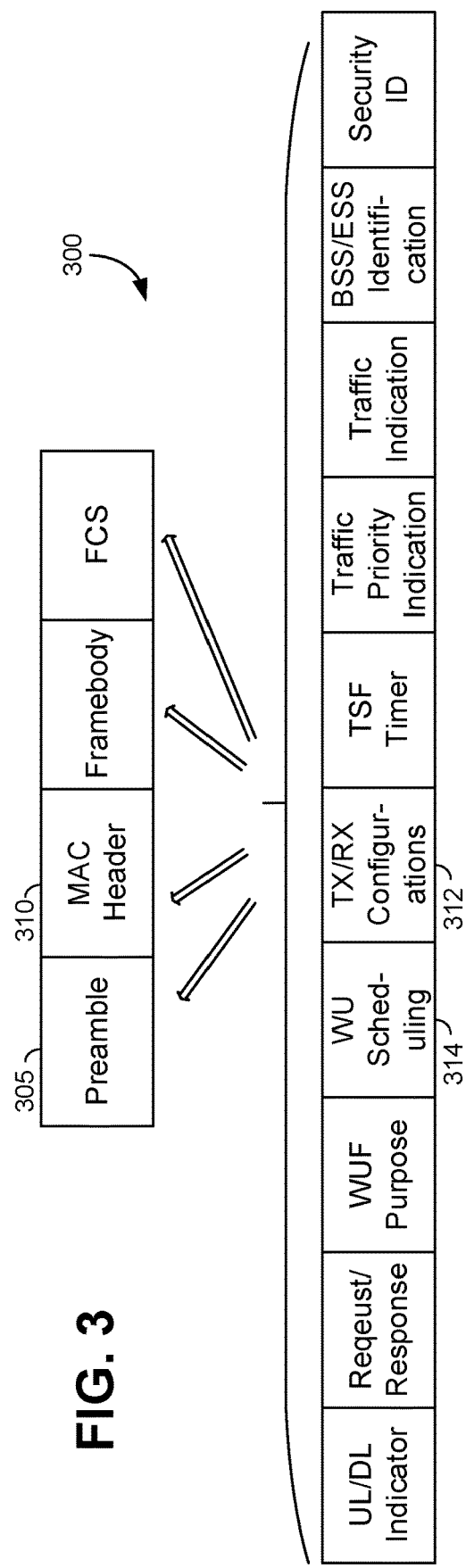
FIG. 3 depicts a design of a wake up response frame (WURespF), in accordance with some embodiments.

In some embodiments, a WUR associated with a STA uses a Wake Up Response Frame (WURespF) to respond to one or more received WUReqFs. Additionally, a WUR associated with a STA, for example, an AP, may use a WURespF to wake up one or more STAs, which in some scenarios may take place before the STA receives any WUReqF. FIG. 3 illustrates a design of a wake up response frame (WURespF) 300, in accordance with some embodiments. It should be noted that any frame received from the intended recipient's WUR or PCR within a wide interframe space (WIFS) (IFS period≥short IFS (SIFS) and <DCF IFS (DIFS)), may be used for indicating successful reception of the WUReqF.

As shown, the WURespF 300 may include many of the same fields as the WUReqF, however it additionally includes a Result Code field 302. In some embodiments, the Result Code field includes the response to the WUReqF. In at least one such embodiment, the Result Code field includes one or more of an ACK, deferred access, rejection, and success. This information may be indicated in any part of the WUF, such as in the preamble 305 or MAC header 310. For example, a WUR ACK frame may be indicated by the Type and Subtype field in the preamble and/or MAC headers.

Further, the WURespF includes information 312 indicating one or more sets of TX/RX modes and configurations to be used by the WUR and/or PCR of one or more targeted STA(s), possibly at the time as indicated in the WU Scheduling field 314. The configuration information may include the following:

TX/RX Mode: which may include SU, MU, MU OFDMA, MU MIMO, the number of Spatial Streams, the number of spatial time streams, and the TX/RX bandwidth/RUs that the targeted STA(s) should use.

TX/RX Band: the operating band(s) that the targeted STAs should use, with values and/or bits indicating values including Sub 1 GHz, 2.4 GHz, 5 GHz, 6 GHz, 45 GHz, and/or 60 GHz, or other bands. The band(s) may be indicated by a value or one or more bits in a bit map.

TX/RX Bandwidth and resource allocation for the targeted STAs for TX and/or RX. Values for this field may include one or more 5 MHz, 10 MHz, 20 MHz, 40 MHz, 80 MHz, 160 MHz, 80+80, or any large or smaller bandwidth such as RUs, and/or down-/up-clocked bandwidths, as well as the RUs and/or (sub) channels assigned to the targeted STAs.

It is worth noting that any part(s) of the WUReqF and/or WURespF, or any combination thereof, may be implemented in any form, including any part(s) of any WUF format, regular 802.11 formats, information elements, control frame, management frames, extension frames, NDP frames, PHY-only frame, scramblers seeds, phrase rotations, MAC and PHY headers, including WUR preambles and regular preambles, or PHY-Only Frame.

Medium Access Procedures When AP is Woken Up For Association

In some embodiments, a method for waking up an AP for association and the medium access procedure for an STA and AP using their primary connectivity radio (PCRs) after the AP is woken up includes an STA, (e.g., STA1), equipped with a WUR sending a WUF such as a WUReqF to discover a suitable AP. In some embodiments, STA1 may include a broadcast or multicast WUReqF, a list or a hash of identifiers for one or more of BSS's, SS's, ESS's, such as BSSIDs, SSIDs, ESSIDs, HESSIDs, BSS Color, etc. that are of interest in the WUReqF. Additionally, STA1 may also include one or more the following information in the WUReqF:

Uplink direction transmission.

TX/RX capabilities: TX/RX capabilities including the generation of STA1, the bandwidth and operating class supported by STA1, the SU, MU, OFDMA, MU-MIMO mode supported by STA1, the operating band supported by STA1, the RU granularity supported by STA1, etc. STA1 may also indicate a preferred operating band, bandwidth or mode.

STA Type: such as mobile phone, sensors, meters, laptops, sensor backhauls, front hauls.

Buffered traffic priority and indication: the priority and indication of any buffered traffic for UL transmission.

Security Credentials: security credentials that may be previously established, for example, in the Security ID field.

WUR RX: may indicate whether the WUF transmitter has a WUR receiver. In some embodiments, WUR transmitters only expect to receive from WLAN PCRs.

STA1 may send a unicast WUReqF to a particular AP, (e.g., AP1), if it has pre-acquired information indicating AP1's presence. In some embodiments, STA1 may have pre-acquired information through a different network connection such as cellular or License Assisted Access (LAA), through previous visit and association, or through directions from other APs. In some embodiments, STA1 may have received a WUR reference signal or (short) beacon from AP1. In some embodiments, STA1 may include indication in the unicast WUReqF that it has pre-acquired information, such as through a previous connection, and may also include in the WUReqF information indicating one or more of the following:

AP-CSN (AP Configuration Sequence Number): the AP-CSN or compressed AP-CSN that STA1 has acquired from a previous association or in any other manner.

A Common Advertisement Group (CAG) Number or a compressed CAG that STA1 has acquired from a previous association or in any other manner on, e.g., network services provided.

Security Credentials: security credentials that were previously established, for example, in the Security ID field.

If STA1 has not received a response to its WUReqF on a channel for a certain duration, and/or it has not received any (short) beacon, measurement pilots, probe response, or FILS Discovery frame, STA1 may switch to another channel and restart the WUR AP discovery process.

In some embodiments, if AP1 receives a WUReqF from STA1, AP1 may recognize that STA1's purpose is (re) association because it is either indicated by the purpose of WUReqF, AP1 has recognized that STA1 is not currently associated with itself, or AP1 has detected that one or more identifiers of BSSs, SSs, ESSs, are included in the WUReqF. In some embodiments, AP1 may ignore the WUReqF if its own BSSID, SSID and/or ESSID, BSS Color, are not included in the WUReqF. AP1 may ignore the WUReqF if the security credentials included do not match its record or are not correct. In some embodiments, AP1 may ignore the WUReqF if it does not support and/or prefers not to support any of the TX/RX configurations or the STA's preferred TX/RX configurations. In some embodiments, AP1 may ignore the WUReqF if it is targeted to its SS or ESS, and AP1 is not scheduled to respond. In some embodiments, AP1 may ignore the WUReqF if STA1 is not a type of STA that the AP1 supports and/or prefers.

In some embodiments, the AP1 may respond to the WUReqF with a WURespF or a PCR response if one or more the following conditions are met:

The WUReqF is for (re)association purposes.

The STA is a type of STA that AP1 supports and/or prefers.

The WUReqF includes a list or hash or identifiers for BSSs, SSs, ESSs, or BSS Color, to which AP1 belongs.

The WUReqF is a unicast frame targeted at the AP1.

The security information included are verified if such security information is included in the WUReqF.

AP1 is the responding AP for its SS and/or ESS.

AP1 supports and/or prefers to support one or more STA1's generation, (preferred) operating band, bandwidth, TX/RX mode.

The priority/type of traffic buffered at the STA1 met the requirements of AP1.

In some embodiments, the AP1 may respond to a single WUReqF with a WURespF or a PCR response, which may be a unicast and/or broadcast/multicast frame. If AP1 receives multiple WUReqFs from more than one STA, it may respond with a broadcast or multicast WURespF or PCR response, which may include the identifiers of one or more STAs from which it received the WUReqF. If AP1 has identified that one or more STA has sent WUReqFs for the purpose of (re)association, AP1 may include in the WURespF or in the PCR response a scheduling including a time at which a broadcast probe response or (short) beacon will be transmitted, using the AP's PCR in some embodiments.

In some embodiments, AP1 may include a version of the TSF timer, such as the 4, 2 or 1 least significant bytes of the TSF timer, full TSF Timer, or a compressed TSF timer. In some embodiments, the scheduling information included in the WURespF or in the PCR response may reference the TSF timer value.

In some embodiments, if the WUReqF includes a (compressed) AP-CSN and/or CAG Number that is associated with AP1, AP1 may provide in the WURespF or in the PCR response whether the AP-CSN and/or CAG Number is current. If the AP-CSN is no longer current, AP1 may indicate a time in the WUReqF, at which time the PCR of the AP may wake up and send a differential probe response frame including the changed information compared to the previous AP-CSN. In some embodiments, if the CAG Number is no longer current, AP1 indicates the CAG is no longer current it in the WURespF or in the PCR response, so that the STA and AP may start ANQP procedures after association.

In some embodiments, AP1 indicates to one or more STAs whether STA1 should transmit or receive at an indicated time interval, in the WURespF or in the PCR response. In some embodiments, AP1 indicates which band, bandwidth, RU, and/or spatial stream STA1 or each of the STAs should be using for their PCR. In some embodiments AP1 indicates which TX/RX mode, (e.g., SU, MU, OFDMA, MU-MIMO) STA1 should use. In another example, such specifications may be sent in another WUF, such as a WU Trigger frame, which may be transmitted at a time indicated in the WURespF. In some alternative embodiments, a PCR Trigger frame is transmitted to trigger uplink transmissions by the one or more STAs after a wake up time of AP1's PCR, which may be indicated in the WURespF or in the PCR response. In yet another embodiment, AP1 transmits a WURespF or a PCR response simply to acknowledge the reception of the WUReqF. Another WUF, such as WU Trigger frame or Wake-up notification frame, may be transmitted later to provide additional information, such as TX/RX mode, TX/RX band, bandwidth, RU, spatial streams. In some embodiments, such a frame is transmitted by the WUR or PCR.

In some embodiments, in response to receiving a WURespF or WU Trigger frame, STA1 switches its PCR to the correct operating bandwidth, band, and TX/RX mode and follows the instruction to be in TX or RX mode using its PCR, possibly at or before the time indicated by the WURespF and/or WU Trigger frame, using SU or MU mode as indicated to continue probing, authentication, and (re)association process following the instruction of the WURespF and/or WU Trigger frame. If a PCR Trigger frame is transmitted by AP1, then STA1 follows the instructions to conduct probing, authentication, and (re)association process following the instruction of the PCR Trigger frame.

In some embodiments, scheduling of medium access for STA1 is determined by the AP based on the buffered traffic priority, size of the buffered traffic, and/or type of the STAs.

Medium Access Procedures When AP is Woken Up For UL Transmission

In some embodiments, a procedure for a STA to wake up an AP for UL Transmissions and the procedure for medium access for the STA and AP to conduct such UL transmissions includes sending, using STA1 equipped with a WUR, a WUReqF to wake up an associated AP1 when it has information indicating that AP1 is currently in a sleep state. In some embodiments, STA1 includes in the WUReqF information indicating one or more the following:

Purpose of the WUReqF is uplink (UL) data transmission, or emergency reporting, status report.

Uplink direction transmission.

TX/RX mode: TX/RX mode changes as compared to the last communications between STA1 and AP1 or the current TX/RX mode/configurations used by STA1's PCR. Example configurations include the SU, MU, OFDMA, MU-MIMO modes, the RU granularity supported by STA1, and a number of spatial streams, etc. In some embodiments, STA1 also indicates a preferred bandwidth, RU or mode.

Buffered traffic priority and indication: the priority and indication of any buffered traffic for UL transmission.

Security Credentials: security credentials that may be previously established, for example, in the Security ID field.

Specific channel, bandwidth, and allocation to be used by the primary radio(s) for transmission or subsequent receptions. Channel quality information may be included as well, e.g. interference measured at WUR transmitter and/or transmitted power level, to accelerate and improve chances of successful reception of any PCR(s) transmissions back to WUR transmitter.

WUR RX: may indicate whether the WUF transmitter has a WUR receiver. In some embodiments, WUR transmitters only expect to receive from WLAN PCRs.

In some embodiments, STA1 sends a unicast WUReqF to AP1 including information indicating one or more of the following:

AP-CSN (AP Configuration Sequence Number): the AP-CSN that STA1 acquired prior to the STA1 went to sleep. The AP-CSN may be of a compressed form.

CAG Number: the Common Advertisement Group Number that STA1 acquired prior to the STA1 going to sleep. The CAG Number may be of a compressed form.

Security Credentials: security credentials that were previously established, for example, in the Security ID field.

In some embodiments, AP1 receives a WUReqF from STA1. In such embodiments, AP1 recognizes that STA1's purpose is (UL) data transmission based on an indication of the purpose of WUReqF, or AP1 detects that STA1 is associated with itself and the WUReqF includes traffic indications. In some embodiments, AP1 may ignore the WUReqF if the security credentials included do not match its record or are not correct.

In some embodiments, AP1 responds to the WUReqF with a WURespF or with a PCR response. In some embodiments, AP1 may respond to one or more WUReqF with a broadcast/multicast WUR frame or a broadcast/multicast PCR frame to announce that it is awake and may be ready to receive. In some embodiments, AP1 responds to a single WUReqF with a WURespF or with a PCR response, which may be a unicast and/or broadcast/multicast frame. In some embodiments, if AP1 has received multiple WUReqFs from more than one STA, AP1 responds with a broadcast or multicast WURespF or PCR response, which may contain the identifiers of one or more STAs from which it has received WUReqF. In some embodiments, AP1 identifies that one or more STA has sent WUReqFs for the purpose of (UL) data transmission and includes a scheduling in the WURespF or in the PCR response, such as a time at which a trigger frame may be transmitted by AP1's WUR and/or PCR. Alternatively, AP1 may include a scheduling in the WURespF or in the PCR response that is a time at which STA1 may start transmitting. In some embodiments, the scheduled time corresponds to a time after a frame sent by AP1's PCR.

In some embodiments, AP1 includes a version of the TSF timer, such as 4, 2 or 1 least significant bytes of the TSF timer, full TSF Timer, or compressed TSF timer, e.g., to provide synchronization for one or more STAs. The scheduling information that may be included in the WURespF or in the PCR response may reference to this TSF timer value.

If the WUReqF includes (compressed) AP-CSN and/or CAG Number that are associated with AP1, AP1 may indicate whether the AP-CSN and/or CAG Number is current in the WURespF, or in the PCR response. If the AP-CSN is no longer current, the AP may indicate a time in the WUReqF at which the PCR of the AP may wake up and send a differential probe response frame including the changed information compared to the previous AP-CSN. If the CAG Number is no longer current, AP1 may provide an indication in the WURespF or in the PCR response so that the STA and AP may start ANQP procedures using their PCRs.

In some embodiments, AP1 indicates any (DL) buffered traffic, such as traffic priority and/or size, for one or more STAs in the WURespF or in the PCR response.

In some embodiments, AP1 provides an indication to one or more STAs, e.g., STA1 via the WURespF or the PCR response whether STA1 should (i) transmit or receive at an indicated time interval; (ii) and/or which band, bandwidth, RU, and/or (iii) spatial stream STA1 or each of the STAs should be using for their PCR; (iv) and/or which TX/RX mode, such as SU, MU, OFDMA, MU-MIMO, STA1 should use. In another embodiment, such specifications are sent in another WUF, such as a WU Trigger frame, which may be transmitted at the time indicated in the WURespF or PCR response. In another embodiment, a PCR Trigger frame is transmitted to trigger uplink transmissions by the one or more STAs after a wake up time of AP1's PCR, which is indicated in the WURespF or the PCR response. In yet another alternative embodiment, AP1 transmits a WURespF or PCR response simply to acknowledge the reception of the WUReqF; another WUF, such as WU Trigger frame, or Wake-up notification frame may be transmitted later to provide additional information, such as TX/RX mode, TX/RX band, bandwidth, RU, spatial streams; such a frame may be transmitted by the WUR or PCR.

Subsequent to receiving a WURespF or a PCR response, or WU Trigger frame, STA1 may switch its PCR to the correct operating bandwidth, band, TX/RX mode and may follow the instruction to be in TX or RX mode using its PCR, possibly at or before the time indicated in the WURespF, the PCR response, and/or WU Trigger frame, using SU or MU mode as indicated, to continue the UL/DL data transmissions following the instruction of the WURespF, the PCR response, and/or WU Trigger frame. If a PCR Trigger frame is transmitted by AP1, then STA1 should follow the instructions to conduct UL/DL data transmissions process following the instruction of the PCR Trigger frame.

Medium Access Procedures When a STA is Woken Up For UL/DL Transmission

In some embodiments, it may be desirable for an STA to wake up another STA to transmit to and/or to receive from that STA. For example, it may be desirable for an STA to wake up its AP to transmit its UL data and/or to receive any buffered data from the AP. Further, it may be desirable for an STA to wake up a peer to peer STA with which it has established a peer to peer connection to transmit to and/or to receive from that STA.

In some embodiments, a procedure for an STA to wake up another STA for UL/DL/Peer2Peer transmissions and the procedure for medium access for the STAs to conduct such UL/DL/Peer2Peer transmissions includes an STA, e.g., STA1 (which may be a non-AP STA or AP), equipped with a WUR sending a WUF such as a WUReqF to wake up one or more other STAs, e.g., STA2, e.g., when it has information indicating that STA2 is currently in a sleep state. STA1 may include information indicating one or more the following in the WUReqF:

Purpose of the WUReqF is (UL/DL/Peer2Peer) data transmission, or emergency reporting, status report, etc. Downlink/Peer2Peer direction transmission.

TX/RX mode: TX/RX mode changes as compared to the last communications between STA1 and STA2 or the current TX/RX mode/configurations used by STA1's PCR, for example, the SU, MU, OFDMA, MU-MIMO mode, the RU granularity supported by STA1, number of spatial streams, etc. STA1 may also indicate a preferred bandwidth, RU or mode. Additionally or alternatively, STA1 may indicate the TX/RX mode/configuration that STA2's WUR or PCR may adopt for responding to the WUReqF, such as SU, MU, OFDMA, MU-MIMO mode, the RU granularity, number of spatial streams, band, allocated bandwidth/channels/RUs, etc. In addition, it may be specified whether the PCR/WUR of STA2 may be in TX or RX mode at a scheduled time or when the PCR is turned on. In at least one embodiment, the WUReqF includes a flag or signal that optionally requests an acknowledgement. In some embodiments, the WUReqF also includes a flag that indicates the allowable delay before an acknowledgement/WURespF is returned. If the transmitter is not receiving an ACK within the desired delay, it may trigger a retransmission of the WUF.

The WURespF may be sent using code division, subchannel or random access based methods detailed below.

In some embodiments, STA1 indicates the TX/RX mode/configuration that STA2's PCR may adopt for UL/DL/Peer2Peer transmissions, such as SU, MU, OFDMA, MU-MIMO mode, the RU granularity, number of spatial streams, band, allocated bandwidth/channels/RUs, etc.

Buffered traffic priority and indication: the priority and indication of any buffered traffic for UL transmission.

Security Credentials: security credentials that may be previously established, for example, in the Security ID field.

Channel quality information: e.g. interference measured at the WUR transmitter and/or transmitted power level, to accelerate and improve chances of successful reception of any PCR(s) transmissions back to the WUR transmitter.

WUR RX: may indicate whether the WUF transmitter has a WUR receiver. In some embodiments, WUR transmitters only expect to receive from WLAN primary radios.

In some embodiments, STA1 sends a unicast WUReqF to STA2 or a broadcast/multicast WUF to one or more STAs including information indicating one or more of the following:

Request to listen to beacon indication indicating that STA2 needs to turn on its PCR to listen to the beacon for updated information of the BSS. In some embodiments, an AP may transmit a WU (short) beacon which may include an AP-CSN number. If an STA detects that its associated AP has updated the AP-CSN count, it may turn on its PCR and listen to the next (short) beacon at the next TBTT or TSBTT.

CAG Number: the Common Advertisement Group Number that STA1 currently has.

Security Credentials: security credentials that were previously established, for example, in the Security ID field.

If STA2 receives a WUReqF from STA1, STA2 may recognize that STA1's purpose is (UL/DL/Peer2Peer) data transmission because it is either indicated by the purpose of WUReqF, or STA2 has detected that STA1 is its AP or has an established Peer2Peer connection and there are traffic indications included in the WUReqF. In some embodiments, STA2 ignores the WUReqF if the security credentials included do not match its record or are not correct.

In some embodiments, STA2 responds to the WUReqF with a WURespF or a PCR response. Such a response may be sent in SU or MU mode, as indicated by the TX/RX mode/configuration contained in the WUReqF. In some embodiments, the WURespF/PCR response includes scheduling information when the PCR of STA2 will be turned on. The WURespF may also include:

TX/RX mode: TX/RX mode changes as compared to the last communications between STA1 and AP1 or the current TX/RX mode/configurations used by STA1's PCR, for example, the SU, MU, OFDMA, MU-MIMO mode, the RU granularity supported by STA2, number of spatial streams, etc. STA1 may also indicate a preferred bandwidth, RU or mode.

Buffered traffic priority and indication: the priority and indication of any buffered traffic for UL/Peer2Peer transmission.

In some embodiments, STA1 includes a scheduling time at which a trigger frame may be transmitted by STA1's WUR and/or PCR. In such embodiments, the scheduling time is included in a WUReqF, an additional WUF, or a PCR frame. In alternative embodiments, STA1 may include a scheduling time at which STA2's PCR may start transmitting/receiving, possibly after a frame sent by STA1's PCR. In such embodiments, the scheduling time is included in the WURespF or another WUF, such as a WU Trigger frame.

In some embodiments, STA1 indicates to one or more STAs, e.g., STA2, in the WUReqF, whether STA2 should (i) transmit or receive at an indicated time; and/or (ii) which band, bandwidth, RU, and/or (iii) spatial stream STA1 or each of the STAs should be using for their PCR; and/or (iv) which TX/RX mode, such as SU, MU, OFDMA, MU-MIMO, STA1 should use. In some embodiments, such specifications are sent in another WUF, such as WU Trigger frame, which may be transmitted at a time indicated in the WUReqF or following the WURespFs or PCR responses received. In alternative embodiments, a PCR SU/MU transmission is sent by STA1 to one or more STAs including STAs that are indicated by any of the sent WUFs. In some embodiments, a PCR Trigger frame is transmitted to trigger uplink transmissions by the one or more STAs after a wake up time of STA1's PCR, which may be indicated in the WUReqF or any other WUFs. In some embodiments, STA2 transmits a WURespF or PCR response simply to acknowledge the reception of the WUReqF; another WUF, such as WU Trigger frame, or PCR Wake-up notification frame may be transmitted later to provide additional information, such as TX/RX mode, TX/RX band, bandwidth, RU, spatial streams for one or more STAs including STA2. Such a frame may be transmitted by the WUR or PCR of STA1.

In response to receiving a WUReqF, WUF, or WU Trigger frame, STA2 may switch its PCR to the correct operating bandwidth, band, TX/RX mode and may follow the instruction to be in TX or RX mode using its PCR. STA2 may switch possibly at or before the time indicated in the WUReqF, WU Trigger, or WUF, using SU or MU mode as indicated to continue the UL/DL/Peer2Peer data transmissions following the instruction of the WUReqF, WU Trigger frame, WUF, or PCR's SU/MU transmissions. If a PCR Trigger frame is transmitted by STA1, then STA2 should follow the instructions to conduct UL/DL data transmissions process following the instruction of the PCR Trigger frame.

To achieve higher MAC efficiency, STA2 may switch on its PCR and transmit buffered status or management, data, control or extension frames via the UL in response to receiving a WUReqF, or WUF, for waking up STAs for UL transmission, status report, etc. In such embodiments, STA2 may avoid transmitting a frame, such as a WUR frame, PCR frame or a PS-Poll frame, to alert STA1 that STA2 is awake. If STA1 has transmitted one or more WUFs to STA2, then any valid packets transmitted by the PCR of STA2 correctly received by STA1 is an indication that STA2 is successfully woken up. In some embodiments, the valid packets may include e.g., any management, control, data, extension frames, ACK and ACK no ACK frames. If a PCR Trigger frame is transmitted by STA1, then STA2 may follow the instructions to conduct UL/DL data transmissions process following the instruction of the PCR Trigger frame.

In some embodiments, after receiving a WUReqF, WUF, or WU Trigger Frame for waking up STAs for DL transmission, or emergency report, STA2 may responsively turn on its PCR and initiate reception. In some embodiments, the PCR is configured by the configurations indicated by any of the received WUF and/or PCR frames. If STA2 has not received a valid frame from STA1, after some period of time such as some Delay_Threshold (either uni-cast or as part of a MU PPDU), STA2 may send STA1 a frame to alert STA1 that STA2 is awake and ready to receive any DL packets. In some embodiments, the frame sent by STA2 may be a PS-Poll frame or any other management, control, data or extension frame, a NDP frame, NDP MAC frame. In some embodiments, the frame sent by STA2 may also be a data frame if STA2 includes any data frames to transmit to STA1. In response to receiving a valid frame from STA2, STA1 determines that STA2 is awake and that STA1 may transmit any packets to STA2. If STA1 does not have any packets for transmission to STA2, it may indicate such information in a frame transmitted to STA2 and may indicate to STA2 that STA2 may go to sleep and turn on WUR when ready.

In some embodiments, a STA completes a UL data transmission when woken up using a wake up packet that does not contain a purpose indication.

Figure 7:
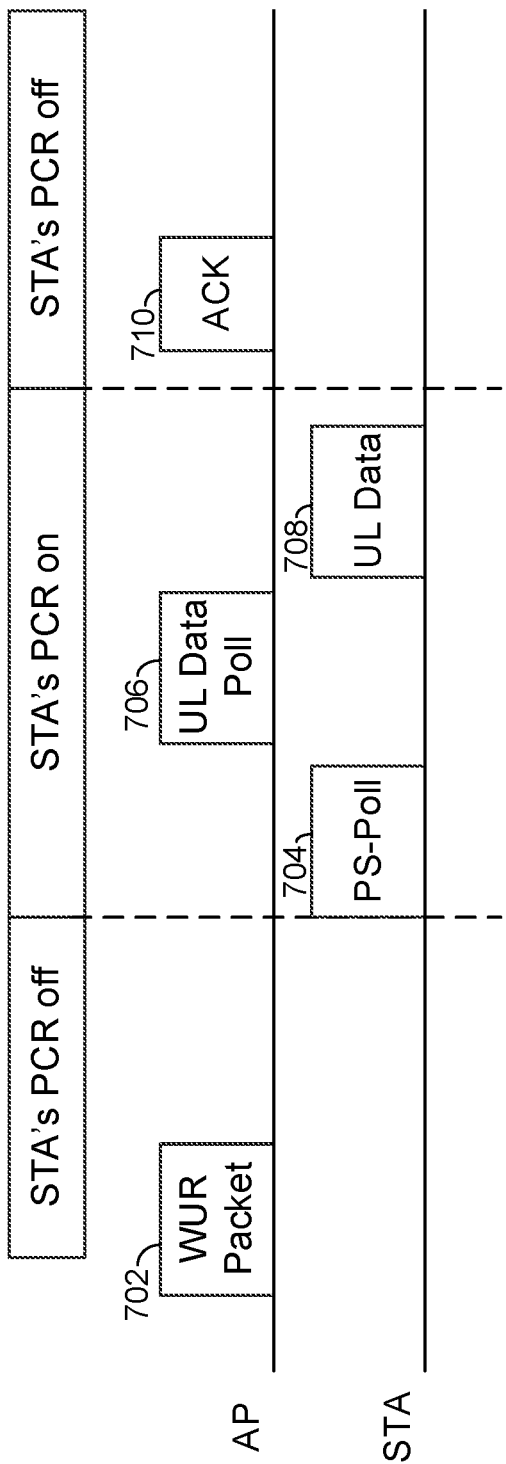
FIG. 7 illustrates a procedure for uplink data without a purposes indication in a wake up packet.

FIG. 7 illustrates a procedure for UL data transmission when a Wake Up Packet (WUP) does not include a purpose indication. As shown, when a STA's PCR is off, the AP transmits a WUR packet 702 with no purpose indication in the WUP, causing additional overhead (packet exchanges). When the AP's PCR is on, and the STA PCR is off, STA transmits a PS-Poll 704 and AP responds with a UL Data Poll 706 or DL packet which contains request for UL data transmission. After the polling, the STA transmits UL data 708 and the AP transmits an ACK 710.

In some embodiments, if the WUP has no purpose indication, it can signal that a STA2 can go to sleep and turn on its WUR when ready.

In some embodiments, a STA completes a UL data transmission when woken up when a WUP includes a purpose indication.

Figure 8:
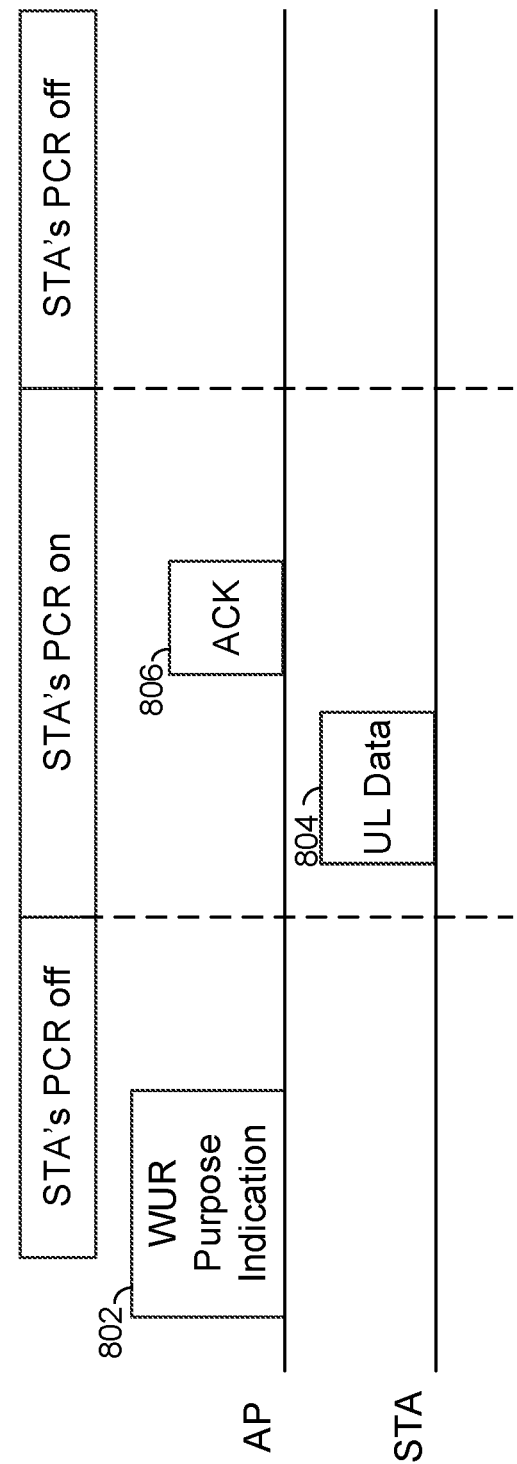
FIG. 8 illustrates a procedure for an uplink data with a purposes indication in a WUP.

In the example of FIG. 8, a STA's PCR is off and an AP has PCR on. The AP transmits a WUP 802 with a purpose indication, e.g., such a purpose indication may be Request UL data transmission, and the STA responds with UL data 804. The AP then transmits an ACK 806. As shown, the presence of a purpose indication decreases the number of packet exchanges.

Figure 9:
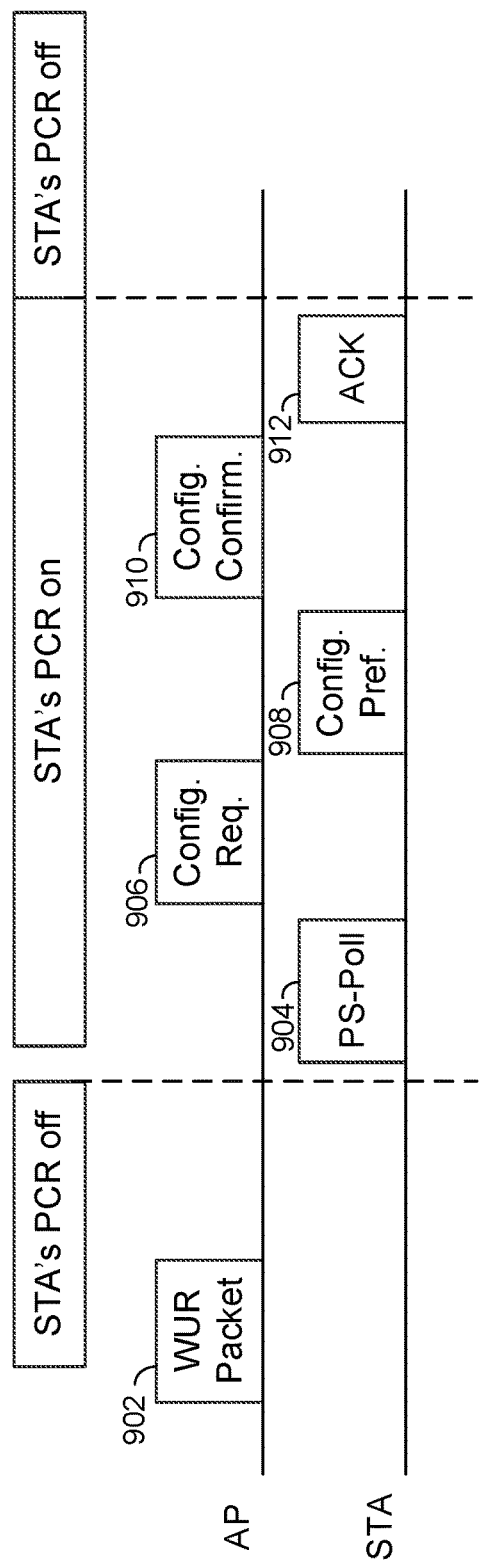
FIG. 9 illustrates a procedure for a configuration request without a purposes indication in a WUP.

In some embodiments, a WUR (Re)configuration procedure takes place in which a Wake Up packet does not contain the purpose indication, as shown in FIG. 9. FIG. 9 illustrates a medium access procedure in which a STA is woken up for configuration/reconfiguration, such as reconfiguration of sleeping/wake-up/monitoring schedules, and/or wake up channels, etc. Such a process may be a part of association/reassociation procedure, or after an AP makes a determination to change its configurations for a STA or for its BSS. More specifically, as shown in FIG. 9, packet exchanges occur when an AP transmits a WUP 902 without a purpose indication relating to a configuration or reconfiguration.

When the STA's PCR is off and the STA receives the WUP without a purpose indication of a (re)configuration, the STA transmits a power save polling (PS-Poll) 904 to the AP. The AP responds with a configuration request 906, and the STA responds with configuration preferences 908. The AP responds with configuration Confirm packet 910 to confirm a configuration, which the STA acknowledges by sending a ACK or BA 912.

Figure 10:
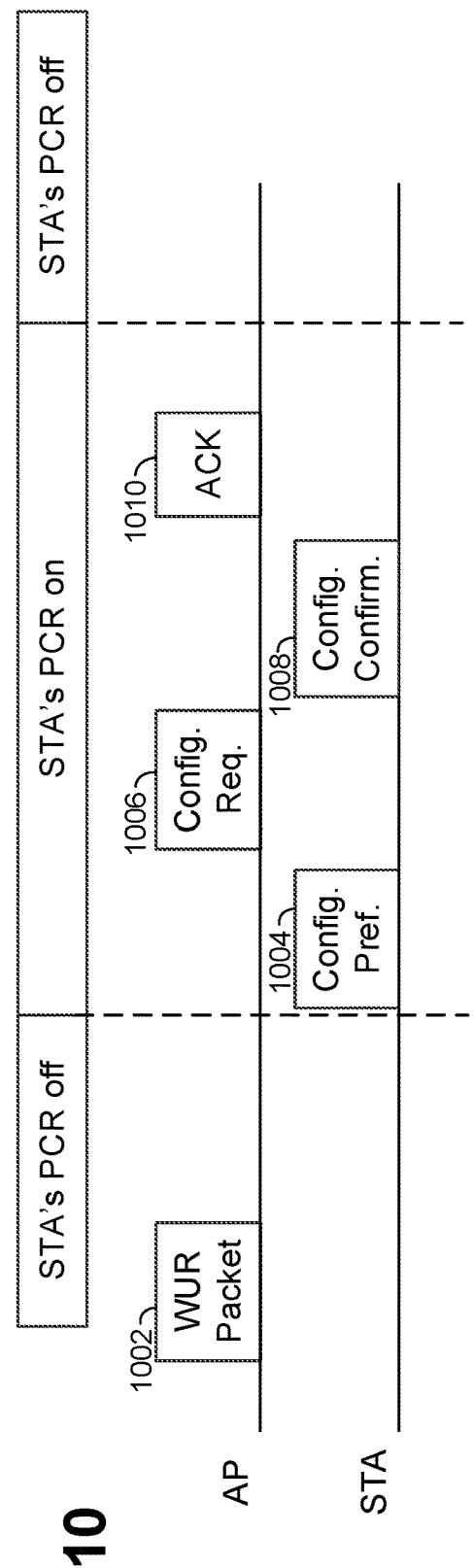
FIG. 10 illustrates a procedure for a configuration request with a purposes indication in a WUP.

In some embodiments, an AP WUR (re)configuration procedure saves packet exchanges and reduces overhead and hence provides additional power saving by including a purpose indication in the WUP. In the example of FIG. 10, a WUP 1002 is sent from the AP to the STA that includes a purpose indication, e.g., the purpose indication may be Configuration, Reconfiguration, (re)configuration of sleep/wake up/monitoring schedules, and/or (re)configuration of wake up channels, thereby allowing the STA to respond with configuration preferences 1004 instead of a power saving polling. For example, when the STA receives the WUP with a purpose indication of (re)configuration, the STA may directly respond with a configuration preference packet 1004 to indicate its preference for the configurations that the AP/STA will negotiate. The AP can then respond with configuration requests 1006. The STA transmits a confirmation 1008 of the configuration and the AP responds with an ACK 1010. After the STA receives the ACK, it may go into sleep by turning off its PCR.

Figure 11:
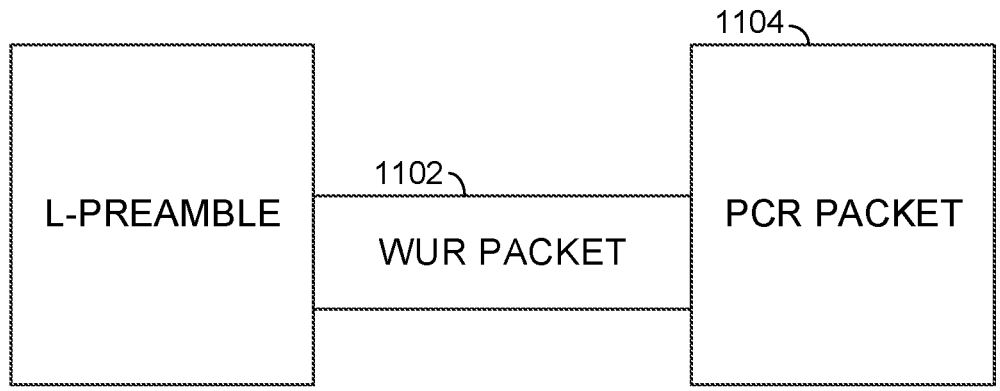
FIG. 11 illustrates single transmission of a WUR packet and a PCR packet, in accordance with some embodiments.
Figure 12:
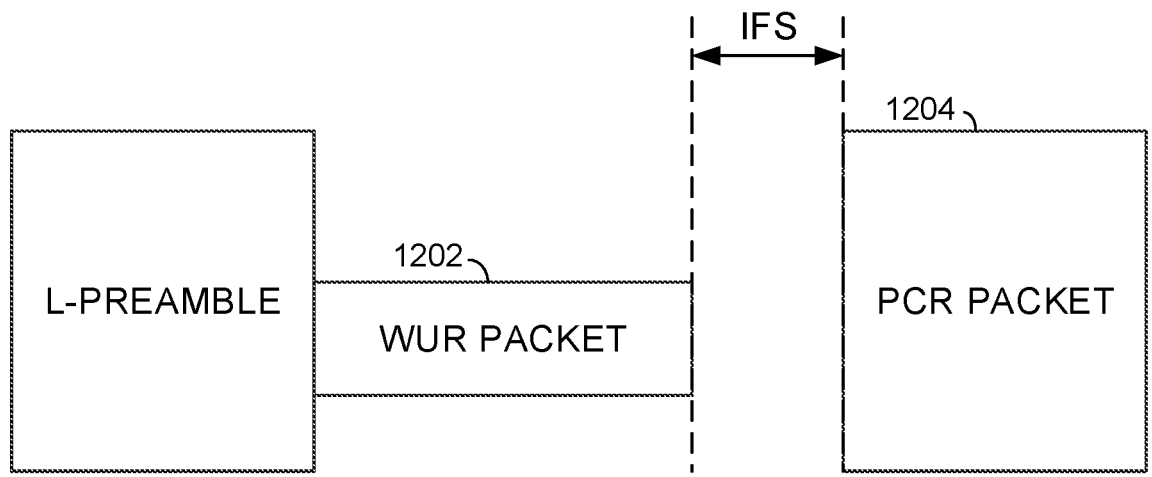
FIG. 12 illustrates consecutive transmission of a WUR packet and a PCR packet, in accordance with some embodiments.

Combined WUR and Primary Connectivity Radio Packets For STA When Woken Up For UL/DL Transmission An STA (which may be a non-AP STA or an AP) may wake another STA(s) to transmit to and/or to receive from the woken-up STA(s). For example, it may be desirable for an AP to wake up the STA to transmit DL data and/or to receive any buffered data from the STA. The STA or AP may make efficient use of the medium by transmitting the WUR and primary connectivity radio (PCR) packets consecutively within the same initial transmission, thus saving the time that would have been used to access the medium a second time for the transmission of the PCR packet, as shown in FIG. 11. FIG. 11 illustrates a WUR packet 1102 and a PCR packet 1104 in a single transmission. Alternatively, the WUR packet and the PCR packet may be separated by a time period such as a SIFS time, which may preserve the medium access. FIG. 12 illustrates an example of consecutive transmission of a WUR packet 1202 and a PCR packet separated by an IFS, which may be an SIFS time.

In some embodiments, a STA may first transmit several WUR packets to wake up one or more STA(s) and follow immediately, or after a short interval, such as a SIFS, with the transmission of the PCR packets meant for the STAs. In such embodiments, the multiple WUR packets may be used to increase the probability of waking up the STA(s). FIG. 13 illustrates transmission of multiple WUR packets. Additionally, in FIG. 14, the consecutive WUR packets may be separated by some interval, such as SIFS, etc.

Figure 16:
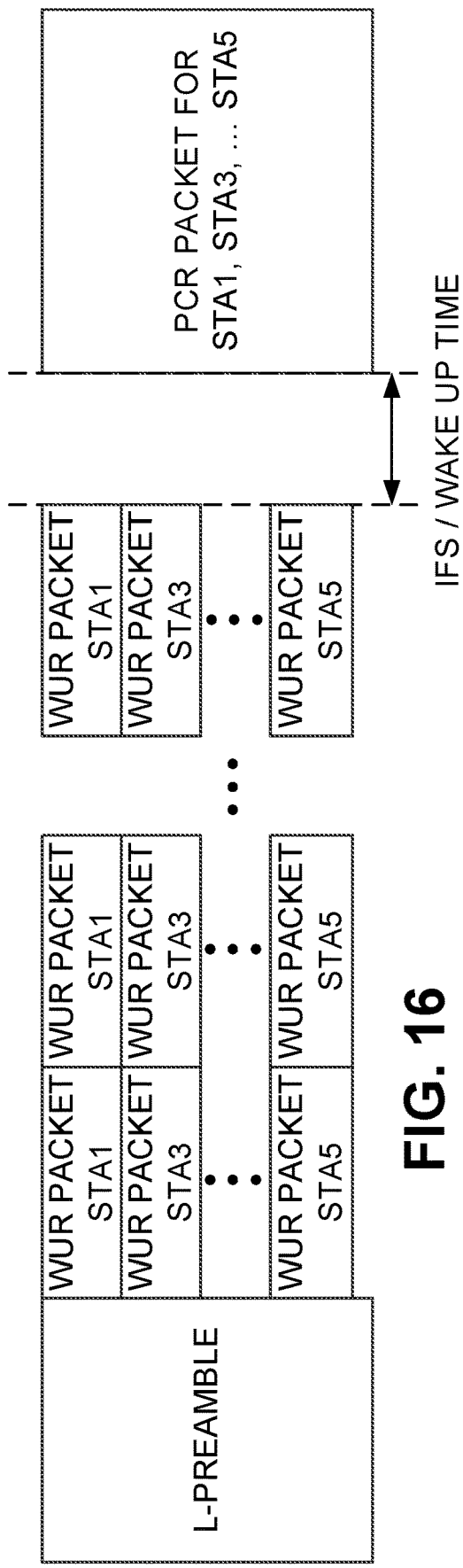
FIG. 16 illustrates consecutive transmission of multiple WUR packets and PCR packets for multiple STAs, in accordance with some embodiments.

In some embodiments, STA1 may transmit multiple WUR packets to a number of STAs concurrently, either in OFDM fashion or time domain, and follow immediately, possibly with a delay, such as a SIFS interval or wake up time, with PCR packet transmissions such as a 802.11ax OFDMA and/or MU-MIMO transmission that are meant for the STAs. FIGS. 15 and 16 illustrate such embodiments, where FIG. 15 illustrates single transmission of multiple WUR packets and PCR packets for multiple STAs, while FIG. 16 illustrates consecutive transmission of multi WUR packets and PCR packets for multiple STAs.

In some embodiments, a procedure for a STA to wake up another STA for UL/DL/Peer2Peer transmissions with a combined WUR and PCR packet and the procedure for medium access for the STAs to conduct such UL/DL/Peer2Peer transmissions may include the following steps. A STA, e.g., STA1 (which may be a non-AP STA or AP), equipped with a WUR transmitter may send a WUF such as a WUReqF to wake up one or more other STAs, e.g., STA2, e.g., when STA1 knows that STA2 is currently in a sleep state. In some embodiments, STA1 includes information in the WUReqF indicating one or more of the following:

Purpose of the WUReqF is data transmission (UL/DL/Peer2Peer), or emergency reporting, status report, etc.

Downlink/Uplink/Peer2Peer direction transmission.

TX/RX mode: TX/RX mode changes as compared to the last communications between STA1 and STA2 or the current TX/RX mode/configurations used by STA1's PCR, such as SU, MU, OFDMA, MU-MIMO mode, the RU granularity supported by STA1, number of spatial streams, etc. STA1 may also indicate a preferred bandwidth, RU or mode. Additionally, or alternatively, STA1 may indicate the TX/RX mode/configuration that STA2's WUR may adopt for responding to the WUReqF, such as SU, MU, OFDMA, MU-MIMO mode, the RU granularity, number of spatial streams, band, allocated bandwidth/channels/RUs, etc. In addition, STA1 will specify when the PCR of STA2 should be in RX mode or when STA2's PCR should be turned on following STA1 WUR transmission. In at least one embodiment, the WUReqF includes a flag or signal that may optionally request an acknowledgement. The WUReqF may also contain a flag that indicates an allowable delay before an acknowledgement/WURespF is returned. In some embodiments, if STA1 does not receive an ACK within the desired delay, STA1 may trigger a retransmission of the WUF. The WURespF may be sent using code division, sub-channel or random access based methods detailed below.

Additionally, or alternatively, STA1 may indicate the TX/RX mode/configuration that STA2's PCR may adopt for UL/DL/Peer2Peer transmissions, such as SU, MU, OFDMA, MU-MIMO mode, the RU granularity, number of spatial streams, band, allocated bandwidth/channels/RUs, etc.

Buffered traffic priority and indication: the priority and indication of any buffered traffic for UL transmission.

Security Credentials: security credentials that may be previously established or, for example, in the Security ID field.

Channel quality information: e.g. interference measured at WUR transmitter and/or transmitted power levels for accelerating and improving chances of successful reception of any PCR(s) transmissions back to WUR transmitter.

WUR RX: may indicate whether the WUF transmitter has a WUR receiver. Note that some WUR transmitters may only expect to receive from WLAN PCRs.

In some embodiments, STA1 sends a unicast WUReqF followed by a unicast PCR packet to STA2, or a WUF broadcast/multicast followed by the broadcast/multicast PCR packet to one or more STAs including information indicating one or more of the following:

Beacon indication; for indicating that the PCR packet includes updated information of the BSS. Alternatively, or additionally, the PCR packet may include an AP-CSN number. If a STA detects that the associated AP has updated the AP-CSN count, the STA may use its PCR to listen to the next (short) beacon at the next TBTT or TSBTT.

CAG Number: the Common Advertisement Group Number that STA1 currently has.

Security Credentials: security credentials that were previously established, for example, in the Security ID field.

In some embodiments, in response to a STA, e.g., STA2, receiving a WUReqF from a STA, e.g., STA1, STA2 may recognize that STA1 transmission includes data transmission (UL/DL/Peer2Peer). In some embodiments, the data transmission is indicated within the WUReqF, or the STA2 has detected that STA1 is its AP or has an established Peer2Peer connection. STA2 may ignore the WUReqF if the security credentials included do not match its record or are not correct.

Alternatively, STA2 may respond to the combined transmission of WUReqF and DL data transmissions with a PCR response. Such a response may be sent in SU or MU mode, as indicated by the TX/RX mode/configuration having been included in WUReqF or any trigger frames contained in the PCR packet. The PCR packet may further include information indicating one or more of the following:

TX/RX mode: TX/RX mode changes as compared to the last communications between STA1 and AP1 or the current TX/RX mode/configurations used by STA1's PCR, for example, the SU, MU, OFDMA, MU-MIMO mode, the RU granularity supported by STA2, number of spatial streams, etc. STA1 may also indicate a preferred bandwidth, RU or mode.

Buffered traffic priority and indication: the priority and indication of any buffered traffic for UL/Peer2Peer transmission.

ACK/BA for received PCR packets.

If STA2 is woken up by a combined transmission of WUR and PCR packets (which may be indicated by the WUR/PCR packets, for example, in the preamble, PHY/MAC header or body) and STA2 has not received a valid PCR packet, it may transmit a packet to STA2, after some interval, such as a PS-Poll, data, control, management, extension, NDP frames, to alert STA1 that it is awake and ready to receive packets.

In some embodiments, STA1 may include a time at which a trigger frame may be transmitted by STA1's PCR in the WUReqF or an additional WUF and a PCR frame scheduling. In alternative embodiments, STA1 may include a scheduling possibly after the frame sent by STA1's PCR. Such a scheduling may indicate a time at which STA2's PCR may start transmitting/receiving in the WUReqF or another WUF such as a WU Trigger frame.

STA1 may indicate to one or more STAs (e.g., STA2) in the WUReqF whether STA2 should transmit or receive at an indicated time. Further, STA1 may indicate which band, bandwidth, RU, and/or spatial stream STA2 or each of the STAs should be using for their respective PCR. Further, STA1 may indicate which TX/RX mode, such as SU, MU, OFDMA, MU-MIMO, STA2 should use. In another example, such specifications may be sent in another WUF, such as WU Trigger frame, that may be transmitted at the time indicated in the WUReqF or following reception of PCR responses. In some embodiments, PCR SU/MU transmissions are sent by STA1 to one or more STAs including STAs indicated by any of the WUFs sent. In some embodiments, a PCR Trigger frame is transmitted to trigger uplink transmissions by the one or more STAs after a wake-up time of STA1's PCR indicated in the WUReqF or any other WUFs. In yet another embodiment, STA2 transmits a PCR response simply to acknowledge the reception of the WUReqF. Another WUF such as WU Trigger frame or a PRC frame may be transmitted later to provide additional information, such as TX/RX mode, TX/RX band, bandwidth, RU, spatial streams for one or more STAs including STA2. Such a frame may be transmitted by the WUR or PCR of STA1.

STA2, after receiving such a WUReqF, WUF, or WU Trigger frame, may switch its PCR to the correct operating bandwidth, band, and TX/RX mode and may follow the instruction to be in TX or RX mode using its PCR. STA2 may switch the PCR at or before the time indicated in the WUReqF and/or WU Trigger frame and/or WUF using SU or MU mode as indicated to continue the UL/DL/Peer2Peer data transmissions following the instruction of the WUReqF and/or WU Trigger frame and/or WUF and/or PCR's SU/MU transmissions. If a PCR Trigger frame is transmitted by STA1, then STA2 may follow the instructions to conduct UL/DL data transmissions process following the instruction of the PCR Trigger frame.

Medium Access and Procedures For WURs and STAs Equipped With WURs

In typical IoT usage scenarios, there may be many sensors and meters located within a relatively small area. For such a dense network, it is likely that a number of STAs will attempt to access the medium and wake up either the same or different APs that are located within the same area. In exemplary embodiments, a medium access protocol is described for providing fair access to these WURs so that the wake-up packets can be correctly received by their respective receivers. Solutions are described below for providing fair and efficient medium access protocols for WURs.

In a dense deployment scenario, multiple STAs may compete and transmit uplink wake-up packets. The uplink wake-up packets may be transmitted using single user transmission mode or multi-user (MU) transmission mode. In order to allow UL MU wake-up packet transmission, an AP may transmit a synchronization reference signal, which may be used for multiple STAs to synchronize and begin uplink access. In some embodiments, allowing UL MU wake-up packet transmission includes a period or a slotted period for uplink wake-up packet transmission. In some embodiments, subsequent to transmission of a synchronization reference signal or other possible DL broadcast frames transmitted through WUR, a period is allocated for uplink wake-up packet transmission. The period may be slotted, and one or more uplink access scheme may be applied.

Code Division Wake-Up Packet Transmissions

In some embodiments, with UL MU wake-up transmission, multiple users are separated in the time/code/frequency/spatial domain. Further, random access may be applied for UL MU wake-up transmission. In some embodiments, multiple users are separated by orthogonal codes, i.e., code division wake-up packet transmission. A set of codes having zero cross-correlation property and good auto-correlation property may be pre-defined and stored for all the WUR devices. The code assignment may follow one or more methods given below.

In some embodiments, the AP assigns each associated WUR STA a code. In some embodiments, the code is released and ready for re-assignment when the STA de-associates with the AP.

In some embodiments, the AP assigns each associated WUR STA a code when its primary radio enters a doze state. The code is released and ready for re-assignment when a primary radio of the STA awakens.

In some embodiments, the STA picks up a code from the code set when it associated with the AP. Alternatively, the STA may pick up a code from the code set when its primary radio enters doze state.

Figure 4:
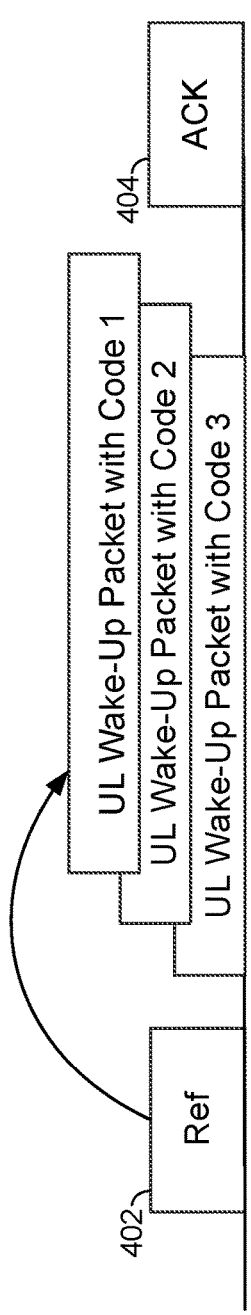
FIG. 4 illustrates a procedure for code division wake-up transmissions, in accordance with some embodiments.

FIG. 4 illustrates an exemplary procedure for code division wake-up transmission, in accordance with some embodiments. As shown, the procedure includes allocating the UL wake up period explicitly or implicitly, assigning code explicitly or implicitly, and applying restrictions. A synchronization reference signal 402 is sent by an access point, and individual STAs respond during an UL wake-up period with UL wake-up packets spread by the appropriate code. The access point may respond with an acknowledgement 404.

In some embodiments, an AP acquires the media through contention or scheduling, and the AP transmits the Synchronization Reference Signal (SRS). In some embodiments, the SRS is transmitted periodically. Alternatively, the SRS may be transmitted only if needed.

In some embodiments, an SRS Physical Layer Convergence Protocol (PLCP) Protocol Data Unit (PPDU) format includes a short training field (STF) field for automatic gain control (AGC) and coarse time/frequency synchronization. The SRS PPDU format further includes a channel estimation field (CEF) field for fine time/frequency synchronization and channel estimation. In some embodiments, the CEF field is an AP-specific sequence by which the STA identifies the WUR BSS. In alternative embodiments, the CEF field is scrambled with an AP-specific sequence by which the STA may identify the WUR BSS. The SRS PPDU format further includes a SIG field for PHY layer signaling. In some embodiments the SIG field is optional in the case that a limited number of bandwidth, coding and modulation schemes may be used for WUR transmission. In some embodiments the SRS PPDU format further includes a MAC frame or a short MAC frame. This field may be optional in the case that SIG field may be overwritten to carry MAC information, or the MAC information may be implicitly signaled. In some embodiments, a MAC frame is a frame with traditional 802.11 MAC frame format. Alternatively, the short MAC frame may be a short format of a MAC frame. For example, the TA and RA may be omitted or reduced since the SRS frame is a broadcast frame, and AP identity may be carried by other fields.

In some embodiments information carried by the SRS includes allocation for a UL wake-up period. In some embodiments of explicit signaling, the allocation indicates the duration of the UL wake-up period, the number of slots if the slotted period may be utilized, code assignment, and a subset of codes which may be allowed in the UL wake-up period (optional in the case that only a subset of STAs are allowed to use this UL wake-up period).

In some embodiments the code assignment includes a xIFS duration after the reception of the SRS packet, for which the STAs intended for UL transmission may transmit a UL wake-up packet with codes. The transmission may be a CDMA-like UL transmission where the packet may be spread by the code.

In some embodiments, a UL wake-up packet PPDU format includes an STF field for AGC and coarse time/frequency synchronization. In some embodiments, the STF field is generated based on the user specific code. The UL wake-up packet PPDU format includes a CEF field for fine time/frequency synchronization and channel estimation. In some embodiments, the CEF field is a sequence generated by the user specific code, by which the AP may identify the STA. In alternative embodiments, the CEF field may be scrambled with the user specific code, by which the AP may identify the STA. The UL wake-up packet PPDU format may also include a SIG field for PHY layer signaling. This field may be optional in the case that limited number of bandwidth, coding and modulation schemes may be used for WUR transmission. In some embodiments, the SIG field is spread by the user-specific code. In some embodiments, the UL wake-up packet PPDU format includes a MAC frame or a short MAC frame. This field may be optional in the case that the SIG field may be overwritten to carry MAC information or the MAC information may be implicitly signaled. In some embodiments, a MAC frame may be a frame with traditional 802.11 MAC frame format. In some embodiments, a short MAC frame may be a short format of a MAC frame. For example, the TA and RA may be omitted or reduced since this is a response frame, and STA identity may be carried by another field, such as the user specific code. In some embodiments, the UL wake-up packet PPDU format includes information carried by the UL wake-up packet, such as STA identity and/or user specific code confirmation. In some embodiments, the UL wake-up packet PPDU format includes an xIFS duration after the UL wake-up packets, for which the AP may transmit an acknowledgement frame to the multiple STAs.

Sub-Channel Division Wake-Up Packet Transmissions

Figure 5:
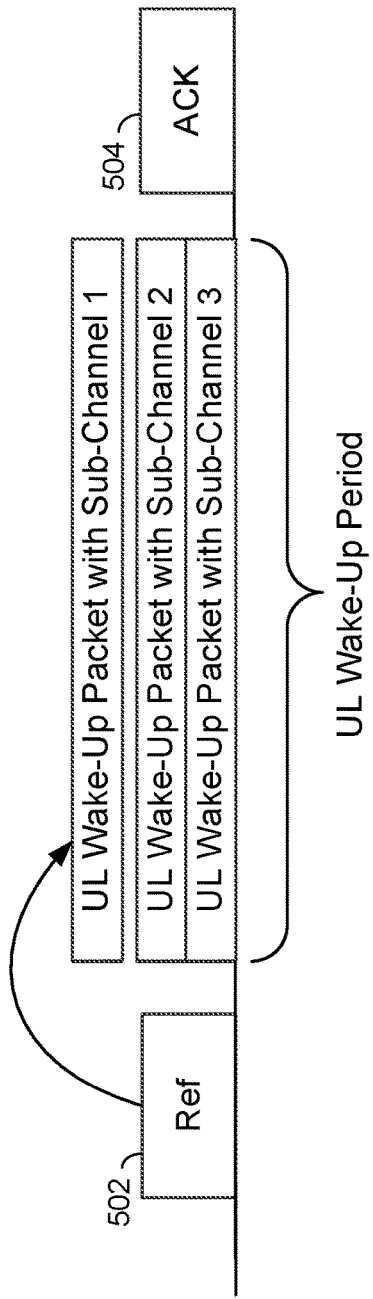
FIG. 5 illustrates a procedure for sub-channel based wake-up transmissions, in accordance with some embodiments.

In some embodiments, multiple users may be separated in the frequency domain, using channel/sub-channel/resource unit based wake-up packet transmission. A set of channels/sub-channels/resource units may be assigned to a group of associated active WUR devices. The channel/sub-channel/resource unit assignment may be signaled in the SRS or previous transmissions. The detailed procedure may be similar to the above-described code-division wake-up packet transmission. In some embodiments, the SRS frame may be broadcasted, multi-casted, or group-casted. FIG. 5 illustrates an exemplary procedure for sub-channel based wake-up transmission. As shown, the procedure includes allocating the UL wake-up period explicitly or implicitly, assigning channels/sub-channels/resource units explicitly or implicitly, and applying restrictions. A synchronization reference signal 502 is sent by an access point, and individual STAs respond during an UL wake-up period with UL wake-up packets using the appropriate sub-channel. The access point may respond with an acknowledgement 504.

Random Access For Wake-Up Packet Transmissions

In some embodiments, multiple users may compete and access the media randomly. Such embodiments may utilize a grid based or slotted UL wake-up period. For example, a M×N grid, having M sub-channels and N time slots may be allocated for random access following the SRS. In such embodiments the minimum value of M and N is 1.

In some embodiments, the random access scheme uses a slotted Aloha-like scheme. In one method, restrictions may be applied to the random access. In such embodiments, the AP assigns each active WUR device a WU ID. Only a subset of STAs with certain WU ID may use the UL wake-up period for random access. The restriction may be signaled in the SRS packet.

Figure 6:
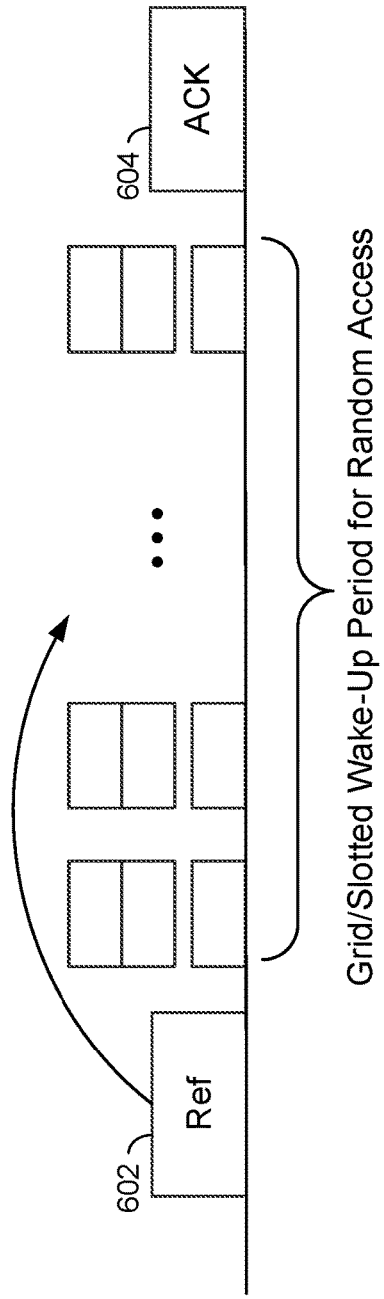
FIG. 6 illustrates a procedure for random access wake-up transmissions, in accordance with some embodiments.

Note in all of the examples shown in this embodiment, UL wake-up period follows the SRS. In alternative embodiments, the SRS packet may carry information to enable a delayed UL wake-up period, where a time offset may be indicated for the start of the UL wake-up period. FIG. 6 illustrates an exemplary procedure for random access wake-up transmission, in accordance with some embodiments. As shown, the procedure includes allocating the UL wake-up period for random access explicitly or implicitly, and allocating a number of slots available for random access. A synchronization reference signal 602 is sent by an access point, and individual STAs respond during an UL wake-up period with UL wake-up packets using a slotted random access procedure. The access point may respond with an acknowledgement 604.

Note on Embodiments.

Figure 17:
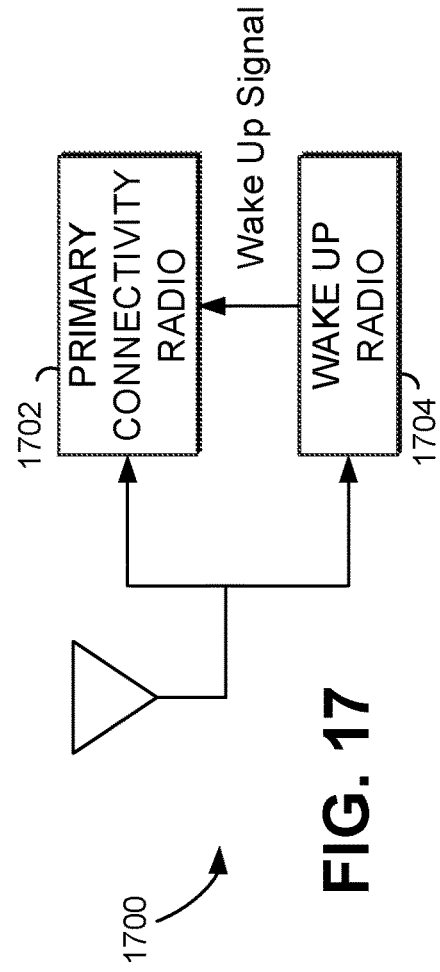
FIG. 17 is a schematic block diagram of a STA equipped with a WUR and a PCR.

Exemplary embodiments are implemented in a STA such as STA 1700 is illustrated in FIG. 17. The access point 1700 includes a primary connectivity radio 1702 operative to send and receive data to communicate with other devices. The primary connectivity radio 1702 is operative to enter a sleep state to conserve energy when data communications are not required. The access point 1700 further includes a wake up radio 1704 that detects incoming wake up frames and determines, using techniques described herein, whether to send a wake up signal to the primary connectivity radio 1702 in response to a wake up frame. To wake up the primary connectivity radio 1702, the wake up radio 1704 is operative to send a wake up signal to the primary connectivity radio 1702.

Although the features and elements are described in the preferred embodiments in particular combinations, each feature or element can be used alone without the other features and elements of the preferred embodiments or in various combinations with or without other features and elements of the present invention.

Although the solutions described herein consider 802.11 specific protocols, it is understood that the solutions described herein are not restricted to this scenario and are applicable to other wireless systems as well.

Although SIFS is used to indicate various inter frame spacing in the examples of the designs and procedures, all other inter frame spacing such as RIFS or other agreed time interval could be applied in the same solutions.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a station (STA) equipped with a wake-up radio (WUR) and a primary connectivity radio (PCR), the method comprising:
   while the STA is in a sleep state, receiving, on the WUR, a wake-up frame (WUF) from an access point (AP), wherein the WUF includes a WUF purpose field indicating one of a plurality of predetermined WUF purposes;
   detecting, from the WUF purpose field, an indication of updated information of a Basic Service Set (BSS); and
   in response to detecting the indication of the updated information of the BSS, waking up the PCR and operating the PCR to communicate with the AP according to the WUF purpose indicated by the WUF purpose field.

2. The method of claim 1, wherein the WUF purpose field indicates Listen to Beacon, and wherein operating the PCR comprises receiving a beacon from the AP on the PCR.

3. The method of claim 2, further comprising returning the PCR to the sleep state after receiving the beacon.

4. The method of claim 1, wherein the WUF purpose field indicates an uplink data transmission, and wherein operating the PCR comprises transmitting uplink data from the STA to the AP.

5. The method of claim 4, wherein the STA does not send any PS-Poll frame between waking up of the PCR and transmission of the uplink data.

6. The method of claim 1, wherein:
   the WUF purpose field indicates multi-user downlink transmissions;
   the WUF includes receive parameters; and
   operating the PCR comprises using the receive parameters to receive a downlink packet intended for the STA.

7. The method of claim 6, wherein the receive parameters include a scheduled receive time for the STA.

8. The method of claim 1, wherein the plurality of predetermined WUF purposes include any of: Listen to Beacon, Uplink Data Transmission, Downlink Data Transmission, and Association.

9. The method of claim 1, wherein the WUF includes an AP Configuration Sequence Number (AP-CSN).

10. The method of claim 9, further comprising:
    determining whether the received AP-CSN is an updated AP-CSN, and
    wherein waking up the PCR is responsive to a determination that the received AP-CSN is an updated AP-CSN.

11. The method of claim 1, wherein the WUF is a broadcast WUF.

12. A station (STA) equipped with a wake-up radio (WUR) and a primary connectivity radio (PCR), wherein the STA is configured to perform functions comprising:
    while the STA is in a sleep state, receiving, on the WUR, a wake-up frame (WUF) from an access point (AP), wherein the WUF includes a WUF purpose field indicating one of a plurality of predetermined WUF purposes;

detecting, from the WUF purpose field, an indication of updated information of a Basic Service Set (BSS); and in response to detecting the indication of the updated information of the BSS, waking up the PCR and operating the PCR to communicate with the AP according to the WUF purpose indicated by the WUF purpose field.

13. The station of claim 12, wherein the WUF purpose field indicates Listen to Beacon, and wherein operating the PCR comprises receiving a beacon from the AP on the PCR.

14. The station of claim 13, wherein the station is further operative to return the PCR to the sleep state after receiving the beacon.

15. The station of claim 12, wherein the WUF purpose field indicates an uplink data transmission, and wherein operating the PCR comprises transmitting uplink data from the STA to the AP.

16. The station of claim 15, wherein the STA does not send any PS-Poll frame between waking up of the PCR and transmission of the uplink data.

17. The station of claim 12, wherein:
the WUF purpose field indicates multi-user downlink transmissions;
the WUF includes receive parameters; and
operating the PCR comprises using the receive parameters to receive a downlink packet intended for the STA.

18. The station of claim 12, wherein the plurality of predetermined WUF purposes include any of: Listen to Beacon, Uplink Data Transmission, Downlink Data Transmission, and Association.

19. The station of claim 12, wherein the WUF includes an AP Configuration Sequence Number (AP-CSN).

20. The station of claim 19, wherein the STA is further configured to perform functions comprising:
determining whether the received AP-CSN is an updated AP-CSN, and
wherein waking up the PCR is responsive to a determination that the received AP-CSN is an updated AP-CSN.

* * * * *